(12) United States Patent
Dabon

(10) Patent No.: US 11,146,704 B2
(45) Date of Patent: Oct. 12, 2021

(54) IMAGE FORMING APPARATUS

(71) Applicant: KYOCERA Document Solutions Inc., Osaka (JP)

(72) Inventor: Philip Ver Dabon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/191,514

(22) Filed: Mar. 3, 2021

(65) Prior Publication Data

US 2021/0289092 A1 Sep. 16, 2021

(30) Foreign Application Priority Data

Mar. 10, 2020 (JP) .............................. JP2020-041065
Mar. 10, 2020 (JP) .............................. JP2020-041066

(51) Int. Cl.
*H04N 1/08* (2006.01)
*G06F 3/12* (2006.01)
*H04N 1/00* (2006.01)

(52) U.S. Cl.
CPC ....... *H04N 1/00676* (2013.01); *G06F 3/1204* (2013.01); *G06F 3/1243* (2013.01); *H04N 1/00724* (2013.01)

(58) Field of Classification Search
CPC .......................... H04N 1/00676; G06F 3/1204
See application file for complete search history.

(56) References Cited

U.S. PATENT DOCUMENTS 6,233,496 B1 * 5/2001 Ippitsu ............. G05B 19/41885
700/133
10,324,673 B1 * 6/2019 Dabon ............... G06K 15/1855

\* cited by examiner

*Primary Examiner* — Ibrahim Siddo
(74) *Attorney, Agent, or Firm* — IP Business Solutions, LLC

(57) ABSTRACT

An image forming apparatus includes an image forming device, a detection device, and a controller. The controller classifies, when image data representing a plurality of cut patterns each having a color is inputted, the plurality of cut patterns by putting the cut patterns having the color of a same family in a same group, according to classification information indicating a plurality of colors classified by family, places the groups of the classified cut patterns on different pages, generates a cutting line representing a contour of each cut pattern, selects the cassette from which a recording medium color of the same family as the family of the cut patterns placed has been detected by the detection device, with respect to each page, supplies the recording medium from the selected cassette, with respect to each page, and forms the generated cutting line on the recording medium, with respect to each page.

7 Claims, 22 Drawing Sheets

Fig.8
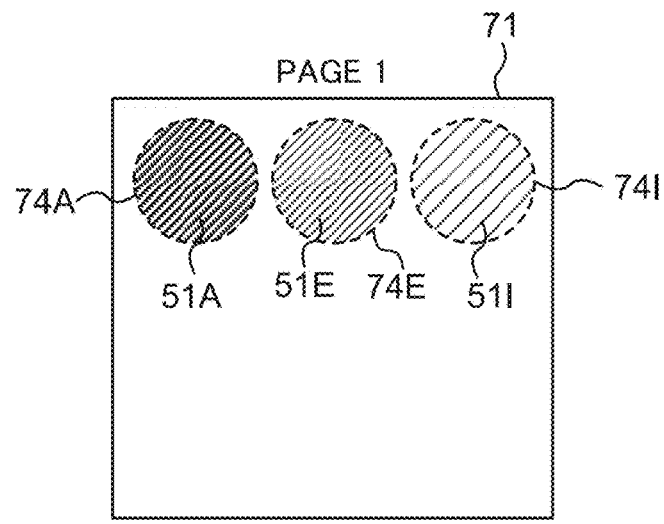
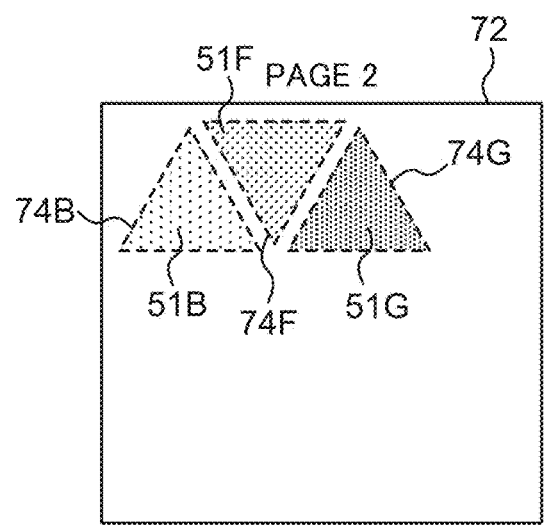
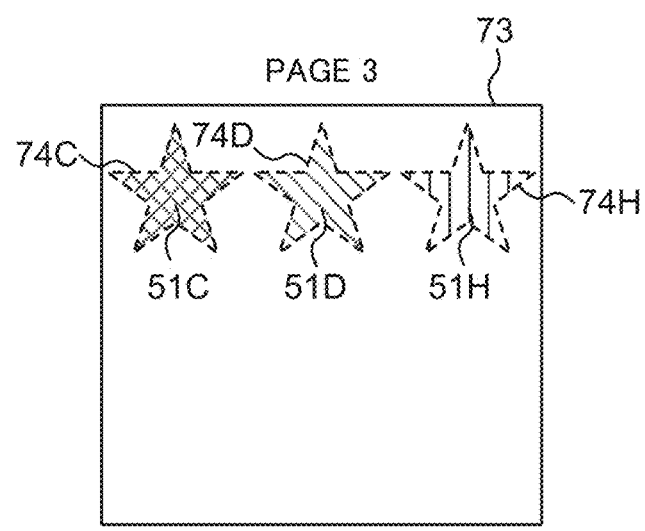

Fig.9
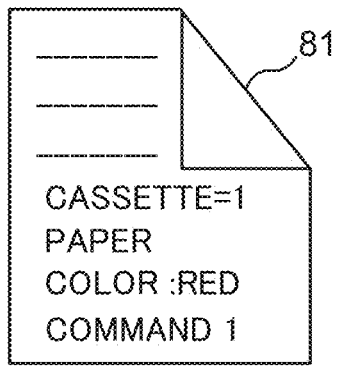
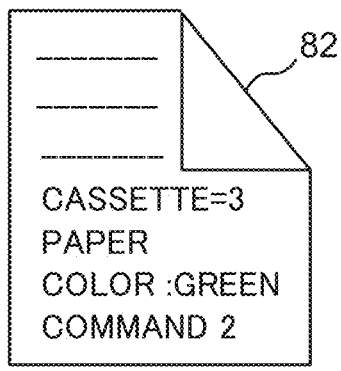
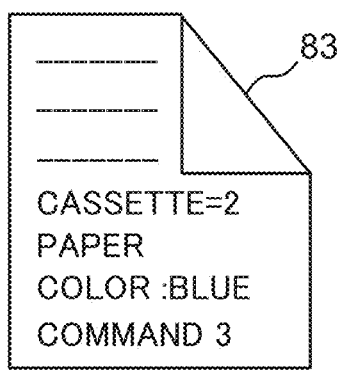

Fig.10
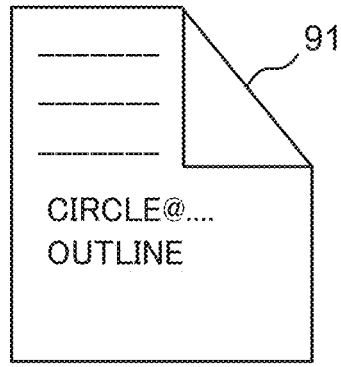
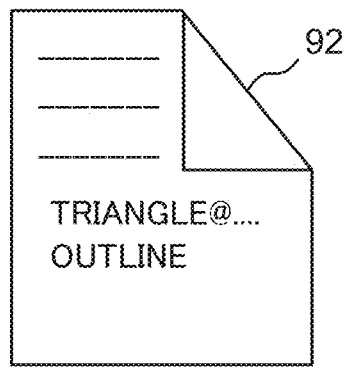
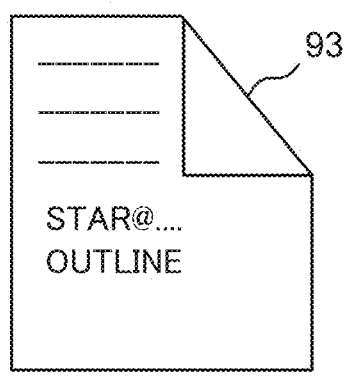

Fig.11
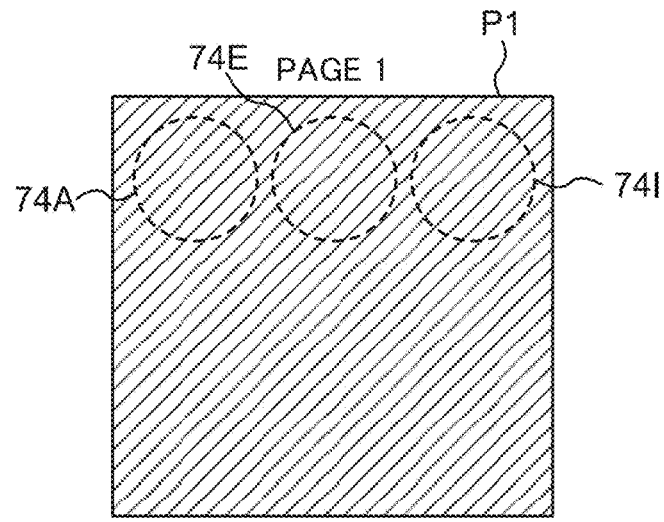
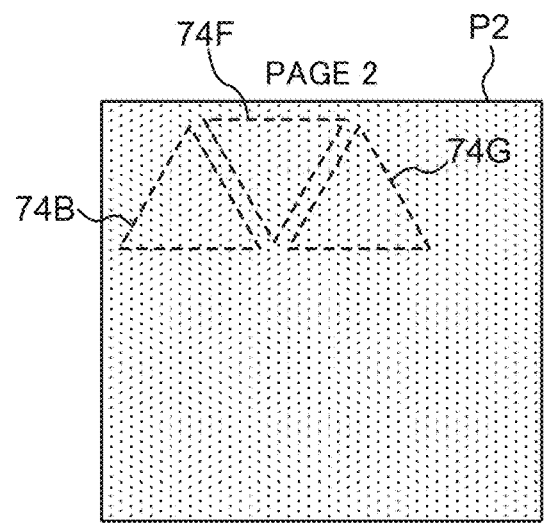
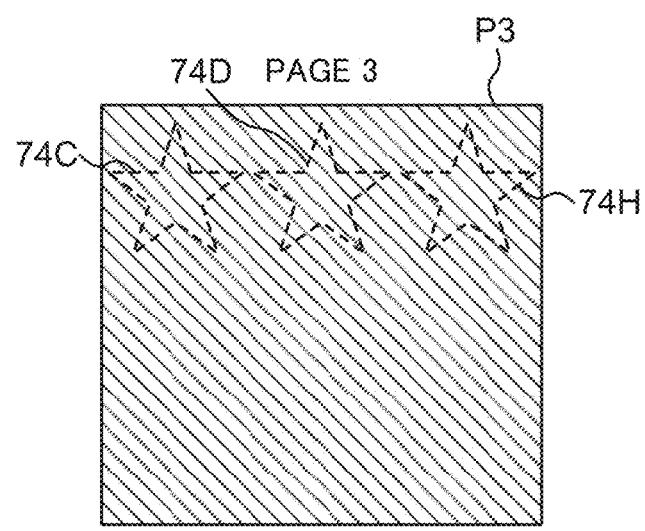

Fig.14
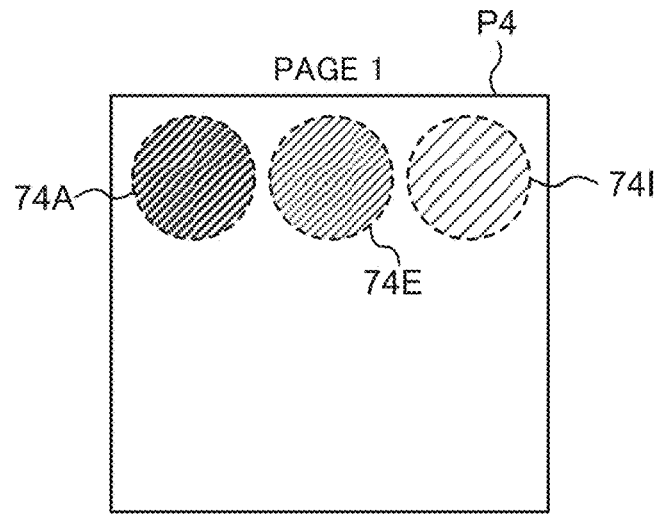
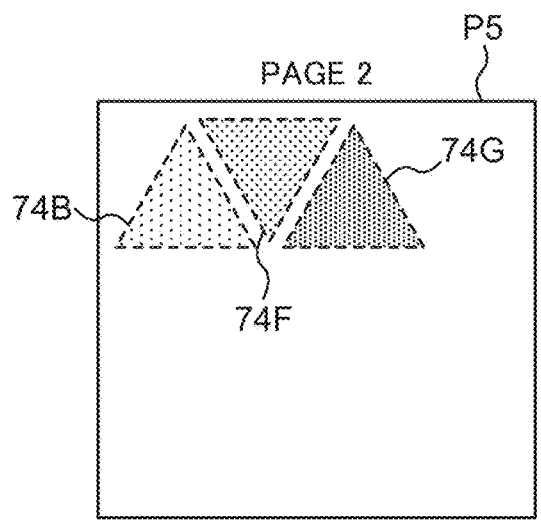
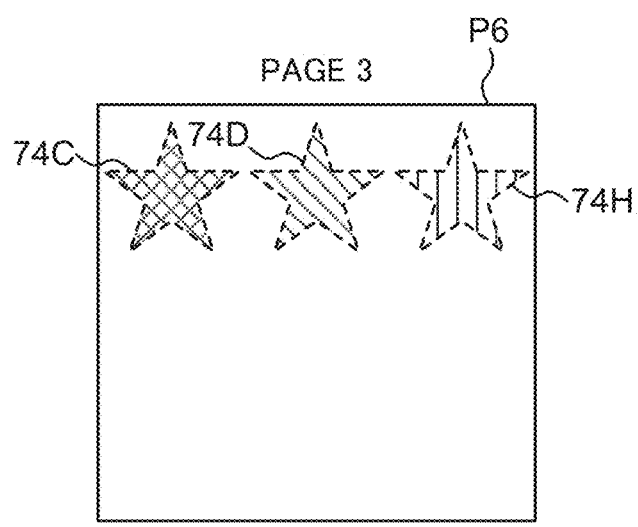

Fig.15
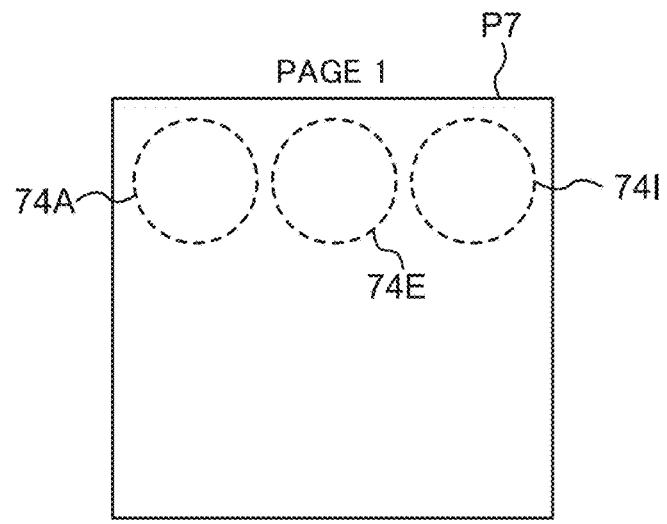
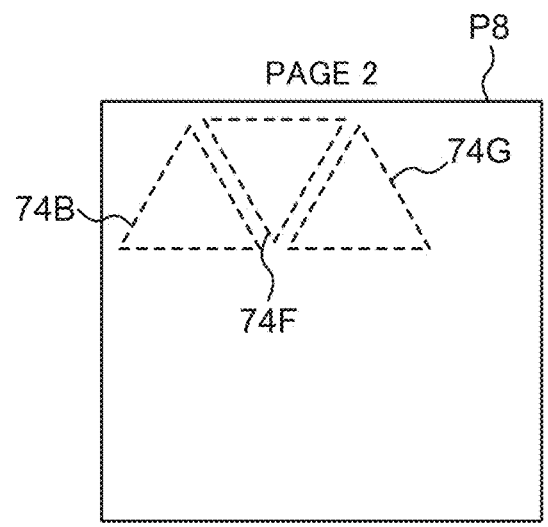
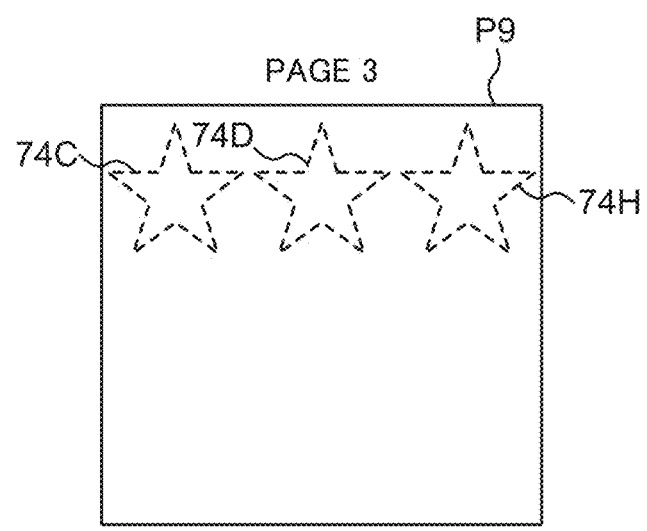

Fig.18
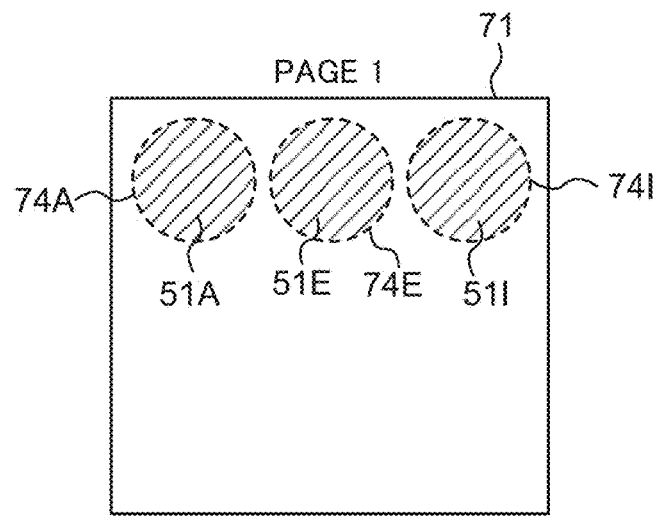
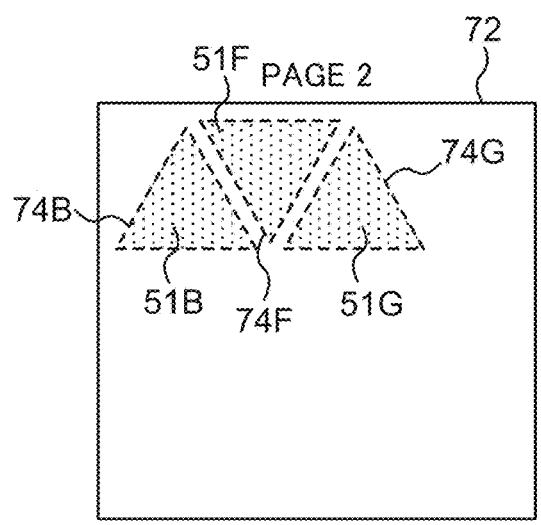
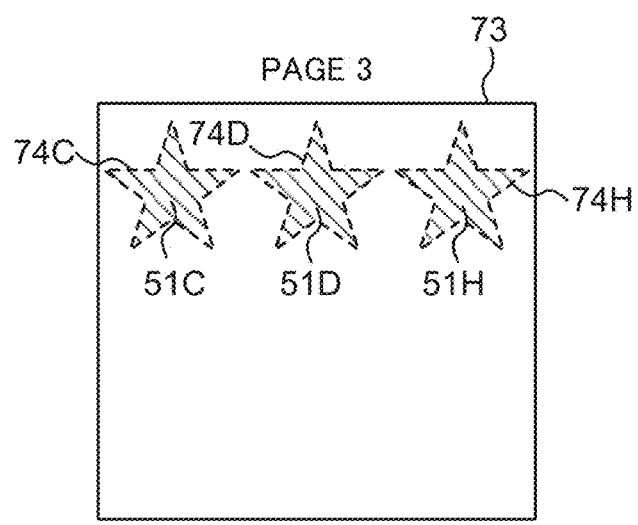

Fig.20
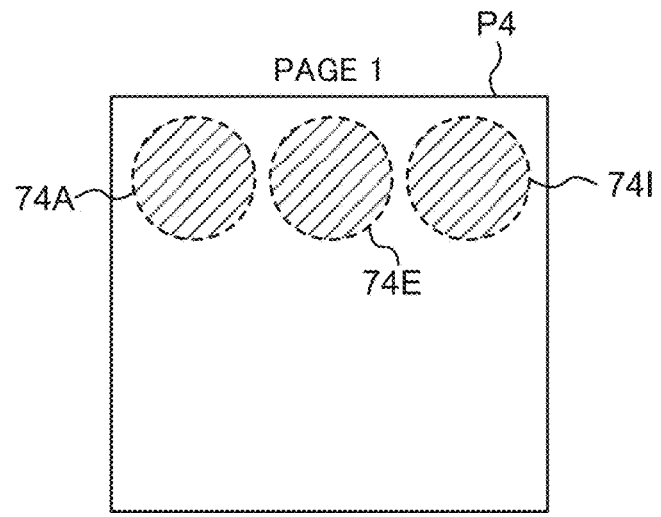
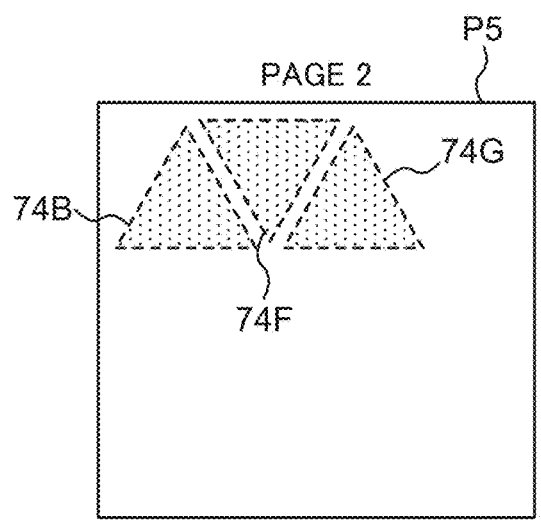
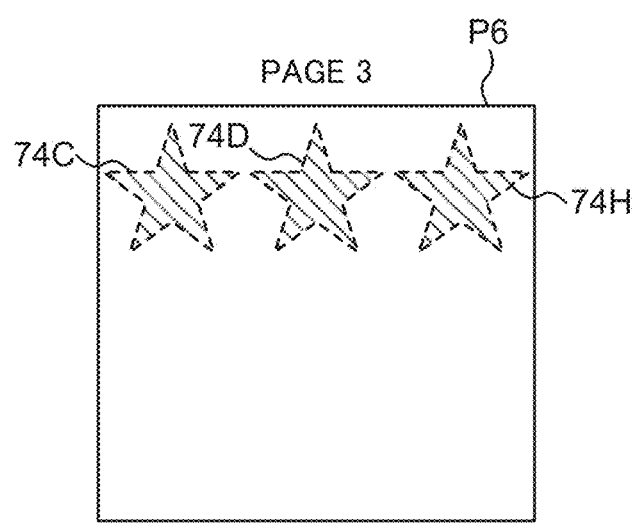

IMAGE FORMING APPARATUS

INCORPORATION BY REFERENCE

This application claims priority to Japanese Patent Application No. 2020-041065 and No. 2020-041066 filed on Mar. 10, 2020, the entire contents of which are incorporated by reference herein.

BACKGROUND

The present disclosure relates to an image forming apparatus, and in particular to a technique to form a plurality of cut patterns each having a color.

A technique to form a cut pattern on a recording sheet, to cut out a predetermined portion from the recording sheet, is known. For example, a technique has been disclosed including detecting a blank region in an image, and placing a cut pattern of a maximum size that can be fitted in the detected blank region, thereby sequentially placing a plurality of cut patterns, by repeating the detection and the placement.

SUMMARY

The disclosure proposes further improvement of the foregoing technique.

In an aspect, the disclosure provides an image forming apparatus including an image input device, an image forming device, a supply device, a detection device, and a control device. The image input device receives an input of image data. The image forming device forms an image on a recording medium. The supply device includes a plurality of cassettes, and delivers the recording medium stored in the plurality of cassettes to the image forming device. The detection device detects a color of the recording medium stored in the plurality of cassettes. The control device includes a processor, and acts as a controller when the processor executes a control program. The controller classifies, when the image data representing a plurality of cut patterns each having a color is inputted through the image input device, the plurality of cut patterns by putting the cut patterns having a color of a same family in a same group, according to predetermined classification information indicating a plurality of colors classified by color family, places the groups each including the plurality of cut patterns classified, on different pages, generates a cutting line representing a contour of each of the plurality of cut patterns placed, selects the cassette, from which a color of the recording medium, of the color family that accords with the color family of the cut patterns placed, has been detected by the detection device, with respect to each of the pages, causes the supply device to supply the recording medium from the selected cassette, with respect to each of the pages, and causes the image forming device to form the generated cutting line on the recording medium, with respect to each of the pages.

BRIEF DESCRIPTION OF THE DRAWINGS

FIG. 8 is a schematic drawing showing examples of cut pattern arrangement;

FIG. 9 is a schematic drawing showing an example of second data;

FIG. 10 is a schematic drawing showing an example of an order list;

FIG. 11 is a schematic drawing showing examples of output images;

FIG. 14 is a schematic drawing showing other examples of the output images;

FIG. 15 is a schematic drawing showing other examples of the output images;

FIG. 18 is a schematic drawing showing examples of cut pattern arrangement;

FIG. 20 is a schematic drawing showing other examples of the output images; and

DETAILED DESCRIPTION

Figure 1:
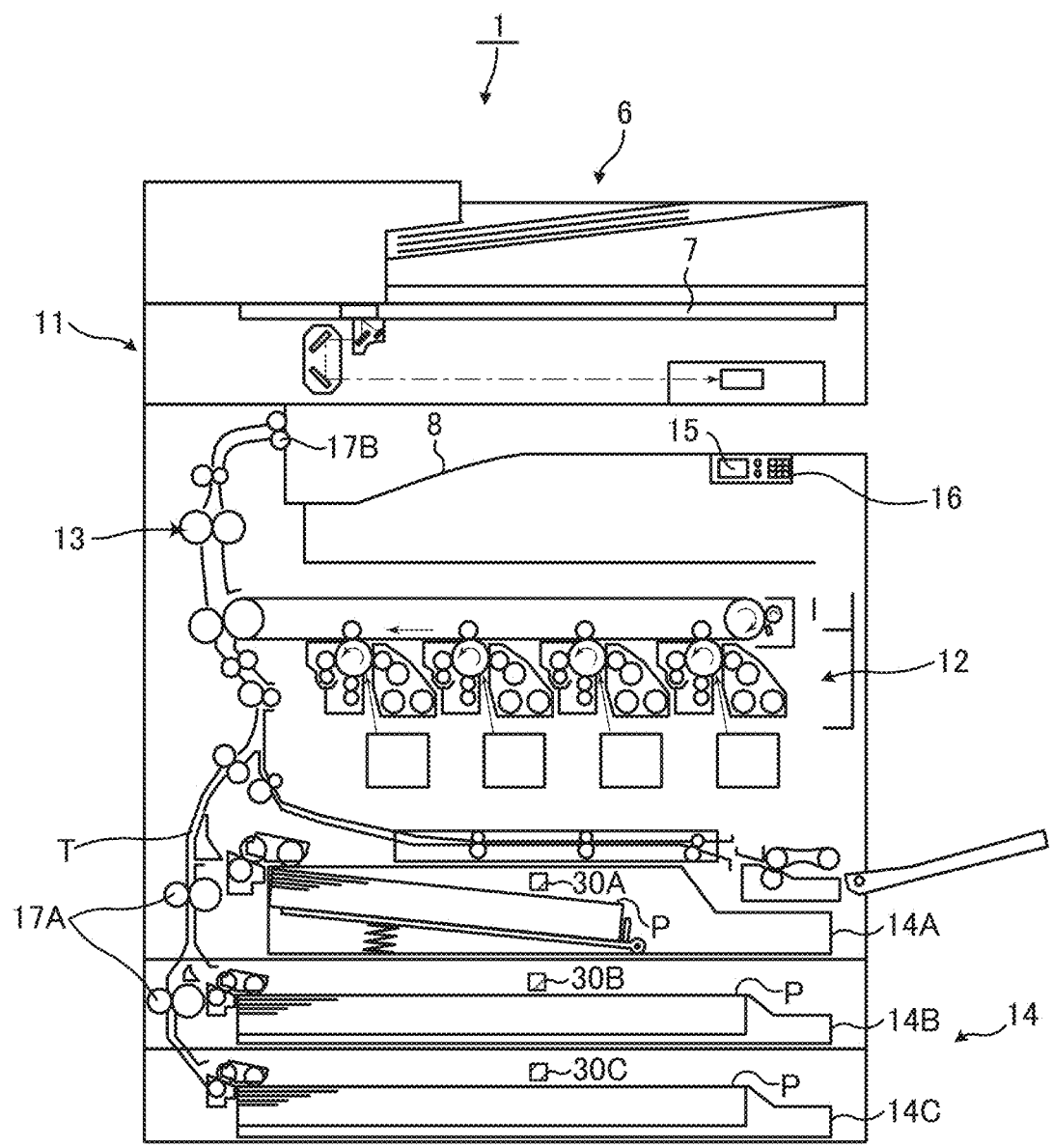
FIG. 1 is a front cross-sectional view showing a structure of an image forming apparatus according to an embodiment of the disclosure.
Figure 2:
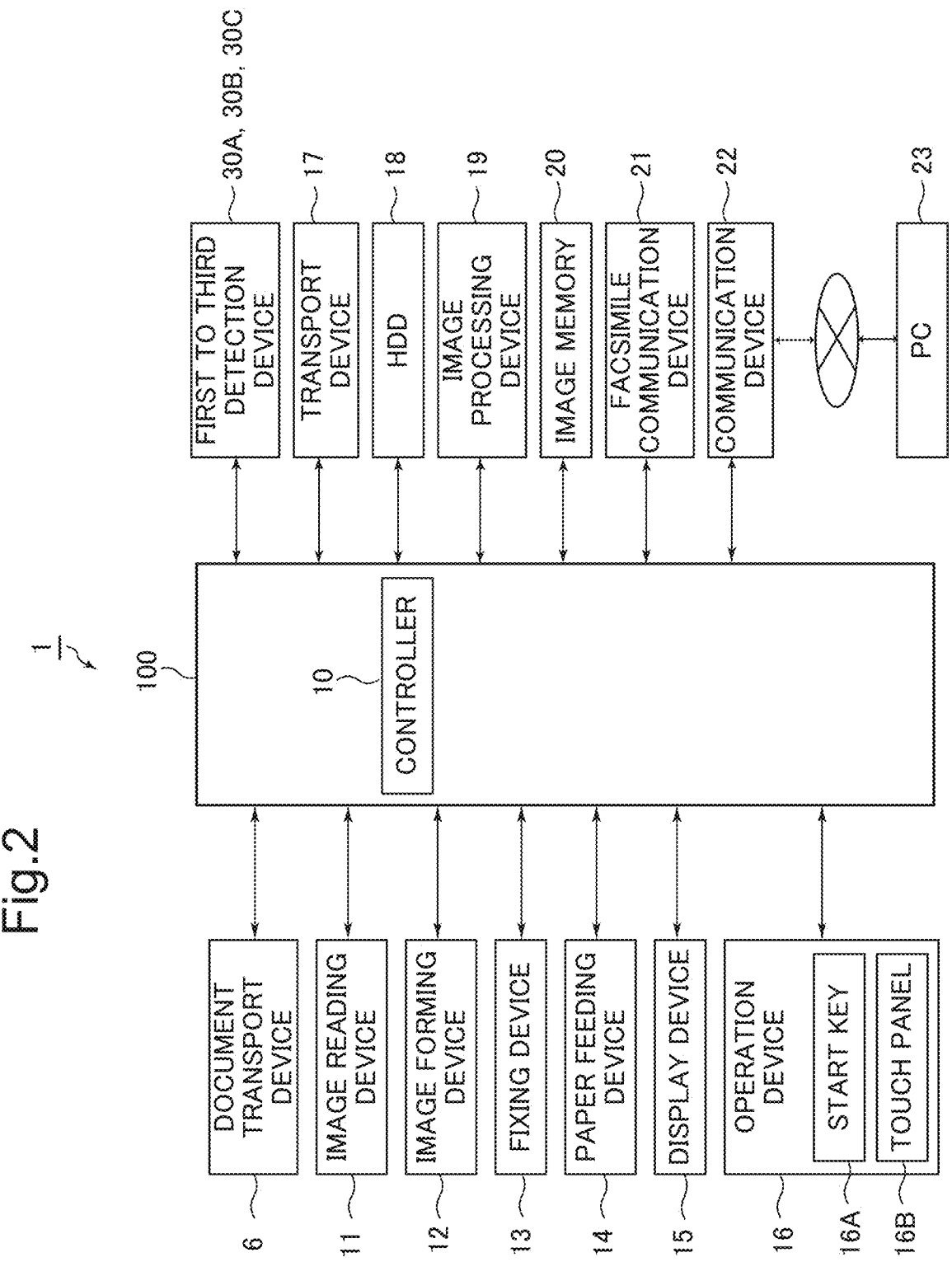
FIG. 2 is a block diagram showing an internal configuration of the image forming apparatus.

Hereafter, an image forming apparatus according to an embodiment of the disclosure will be described. with reference to the drawings. FIG. 1 is a front cross-sectional view showing a structure of the image forming apparatus according to the embodiment of the disclosure. FIG. 2 is a block diagram showing an internal configuration of the image forming apparatus. Referring to FIG. 1 and FIG. 2, the image forming apparatus 1 shown in FIG. 1 is a multifunction peripheral having a plurality of functions such as copying, transmission, printing, and facsimile communication. Inside the casing of the image forming apparatus 1, a plurality of components for realizing the functions of the image forming apparatus 1 are accommodated. Specifically, for example, an image reading device 11, an image forming device 12, a fixing device 13, and a paper feeding device 14 are provided in the casing.

The image forming apparatus 1 includes a control device 100. The control device 100 includes a processor, a random-access memory (RAM), and a read-only memory (ROM). The processor is, for example, a central processing device (CPU), a micro processing device (MPU), or an application specific integrated circuit (ASIC).

The control device 100 acts as a controller 10, when the processor executes a control program stored in the ROM or hard disk drive (HDD) 18. Here, the controller 10 may be constituted in the form of a logic circuit, instead of being realized by the operation according to the control program.

The controller 10 controls the overall operation of the image forming apparatus 1. To be more detailed, the controller 10 controls the operation of each of the components of the image forming apparatus 1, and also the communication with, for example, a personal computer (PC) 23 connected via a network. The controller 10 also executes, by operating according to a cut pattern formation program to be subsequently described, a cut pattern forming operation including placing a plurality of cut patterns indicated by the image data on different pages with respect to each color family, and forming a cutting line indicating the contour of the plurality of cut patterns placed as above, on the recording sheet.

The control device 100 is electrically connected to a document transport device 6, the image reading device 11, the image forming device 12, the fixing device 13, the paper feeding device 14, a first detection device 30A to a third detection device 30C, a display device 15, an operation device 16, a transport device 17, the HDD 18, an image processing device 19, an image memory 20, a facsimile communication device 21, and a communication device 22.

The image reading device 11 is constituted as an automatic document feeder (ADF), including a document feeding device 6 that transports a source document placed on a document table, and a scanner that optically reads the source document transported by the document feeding device 6, or placed on a platen glass 7. The image reading device 11 emits light to the source document from a light emitter, and receives the reflected light with a charge-coupled device (CCD) sensor, to thereby read the source document and generate image data.

The image forming device 12 includes a photoconductor drum, a charging device, an exposure device, a developing device, and a transfer device. The image forming device 12 forms a toner image on a recording sheet P delivered by the transport device 17 along a transport route T, on the basis of the image data generated by the image reading device 11, or inputted through the communication device 22.

The fixing device 13 heats and presses the recording sheet P on which the toner image has been formed by the image forming unit 12, to thereby fix the toner image on the recording sheet P The recording sheet P having the toner image fixed thereon by the fixing device 13 is discharged to an output tray 8.

The paper feeding device 14 includes a manual bypass tray, a first paper cassette 14A, a second paper cassette 14B, and a third paper cassette 14C. The paper feeding device 14 draws out the recording sheets P stored in the first paper cassette 14A to the third paper cassette 14C, or placed on the manual bypass tray, one by one, and delivers the recording sheet P to the transport route T. The paper feeding device 14 exemplifies the supply device in the disclosure.

The first paper cassette 14A includes a first detection device 30A that detects the color of the recording sheet P stored in the first paper cassette 14A. The second paper cassette 14B includes a second detection device 30B that detects the color of the recording sheet P stored in the second paper cassette 14B. The third paper cassette 14C includes a third detection device 30C that detects the color of the recording sheet P stored in the third paper cassette 14C. The type of the first detection device 30A to the third detection device 30C is not specifically limited provided that the detection device is capable of detecting the color of the recording sheet P For example, a photoelectric sensor may be employed.

The display device 15 is constituted of, for example, an LCD or an organic light-emitting diode (OLED) display.

The display device 15 displays, under the control of the controller 10, various types of screens related to the functions that the image forming apparatus 1 is configured to perform.

The operation device 16 includes a plurality of hard keys, such as a start key 16A for instructing the start of various operations. The operation device 16 also includes a touch panel 16B overlaid on the display device 15. The user inputs various types of information, such as the instruction related to the functions that the image forming apparatus 1 is configured to perform, through the operation device 16. The operation device 16 exemplifies the instruction input device in the disclosure.

The transport device 17 includes a transport roller pair 17A and a discharge roller pair 17B, and transport motors electrically connected to the transport roller pair 17A and the discharge roller pair 17B, respectively. The transport roller pair 17A and the discharge roller pair 17B are provided along the transport route T. The controller 10 drives the transport motors to rotate the transport roller pair 17A and the discharge roller pair 17B, to thereby transport the recording sheet P delivered from the paper feeding device 14, to the image forming device 12 and the output tray 8 along the transport route T.

The HDD 18 is a large-capacity storage device for storing various types of data, including the image data generated by the image reading device 11. The HDD 18 contains various control programs to be used to realize basic operations of the image forming apparatus 1. One of the control programs stored in the HDD 18 is the cut pattern formation program for executing the cut pattern forming operation according to the embodiment of the disclosure. The HDD 18 exemplifies the storage device in the disclosure.

HDD 18 contains an analysis program for analyzing a printer job language (PDL) describing job data. The controller 10 analyzes, by operating according to the analysis program, content data representing characters, images or figures, and commands defined by the PDL describing the job data, and generates data of an intermediate format. The controller 10 also converts the data of an intermediate format into data of a subordinate format that can be processed by a printer engine such as the image forming device 12.

Figure 3:
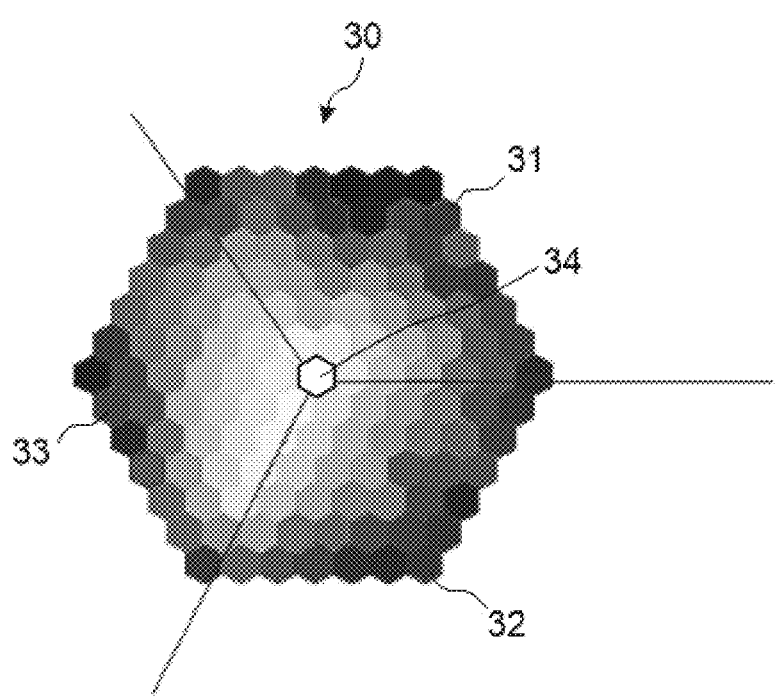
FIG. 3 is a schematic drawing showing an example of classification information.

FIG. 3 illustrates an example of classification information. (1) The classification information 30 indicating a plurality of colors classified by color family is possessed by the control program, to be executed by the processor of the control device 100 to act as the controller 10. In this case, the HDD 18 contains, as the classification information 30, a first group 31 including 48 colors of a blue family, such as blue, light blue, and light purple, a second group 32 including 36 colors of a red family, such as vermilion, red, and orange, a third group 33 including 42 colors of a green family, such as green, yellowish green, and pale green, and a fourth group 34 including one color of a white family, in other words only white. The classification information 30 is specified in advance, according to an instruction inputted by the user through the operation device 16. Here, (2) when the processor of the control device 100 executes the control program, the control program may create a region for storing the classification information 30 in the HDD 18, so that the controller 10 may utilize the classification information 30 when performing the classification. (3) Alternatively, the classification information 30 may be stored in advance in the HDD 18, so that the controller 10 may utilize the classification information 30 when performing the classification. The description given below is based on the case of (3).

The image processing device 19 executes image processing, as necessary, on the image data generated by the image reading device 11. The image memory 20 includes a region for temporarily storing the image data generated by the image reading device 11. The facsimile communication device 21 is connected to the public telephone network, and transmits and receives image data via the public telephone network.

The communication device 22 includes a communication module such as a local area network (LAN) board. The image forming apparatus 1 can perform data communication, for example with the PC 23 connected via the network, through the communication device 22. The communication device 22 exemplifies the image input device in the disclosure.

A power source is provided for each of the components of the image forming apparatus 1, so that those components are activated with the poser from the power source.

Operation of Image Forming Apparatus 1

Figure 4:
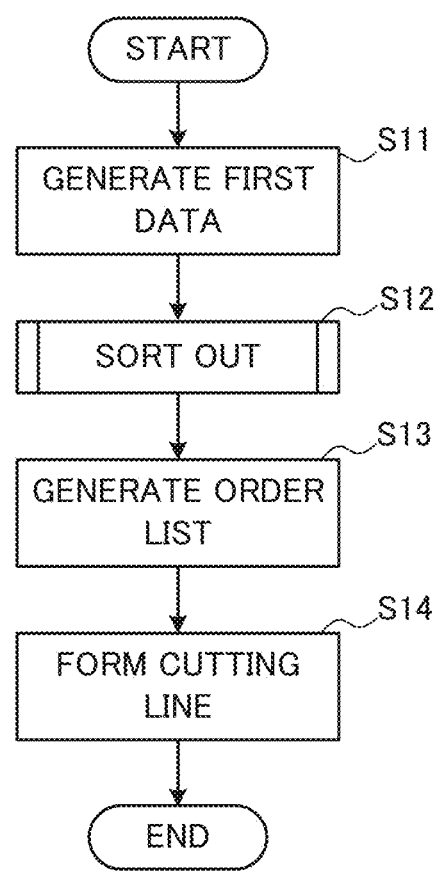
FIG. 4 is a flowchart showing a cut pattern forming process.
Figure 5A:
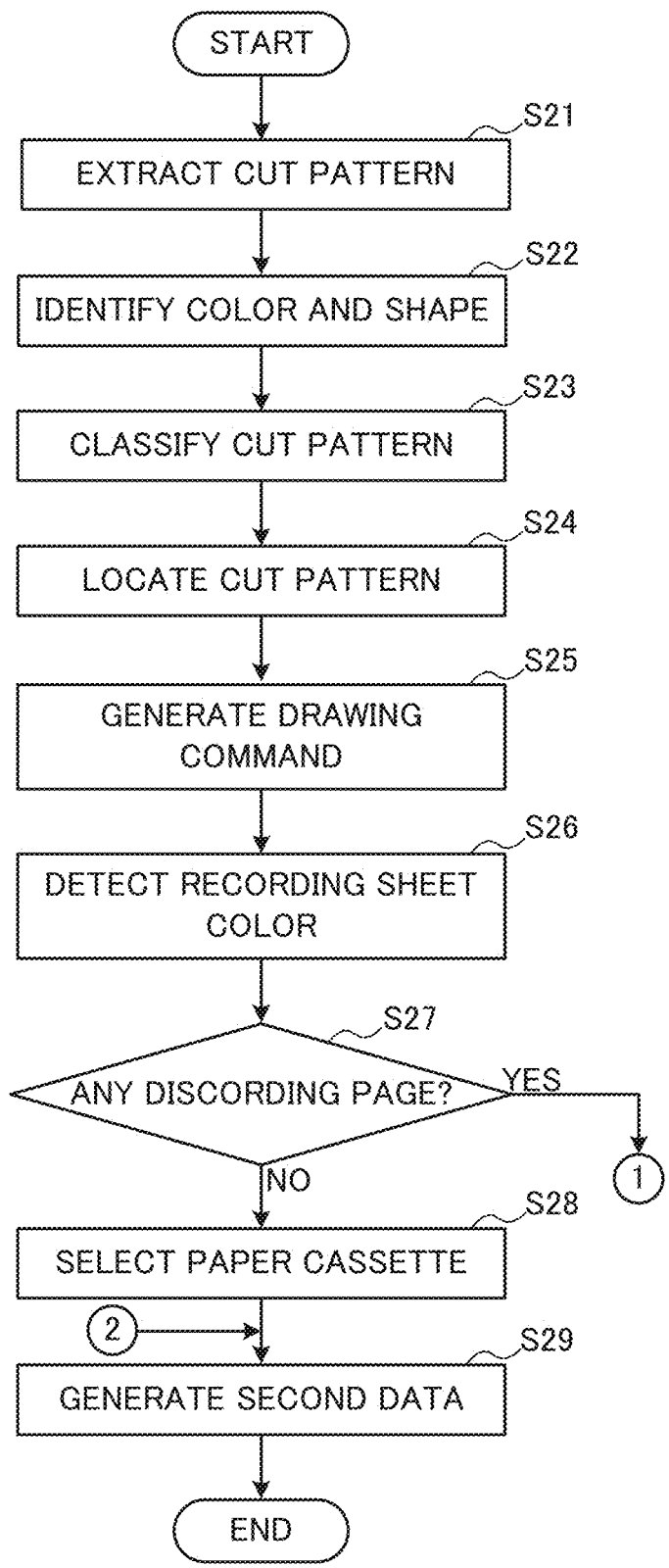
FIG. 5A is a flowchart showing a sorting process.
Figure 5B:
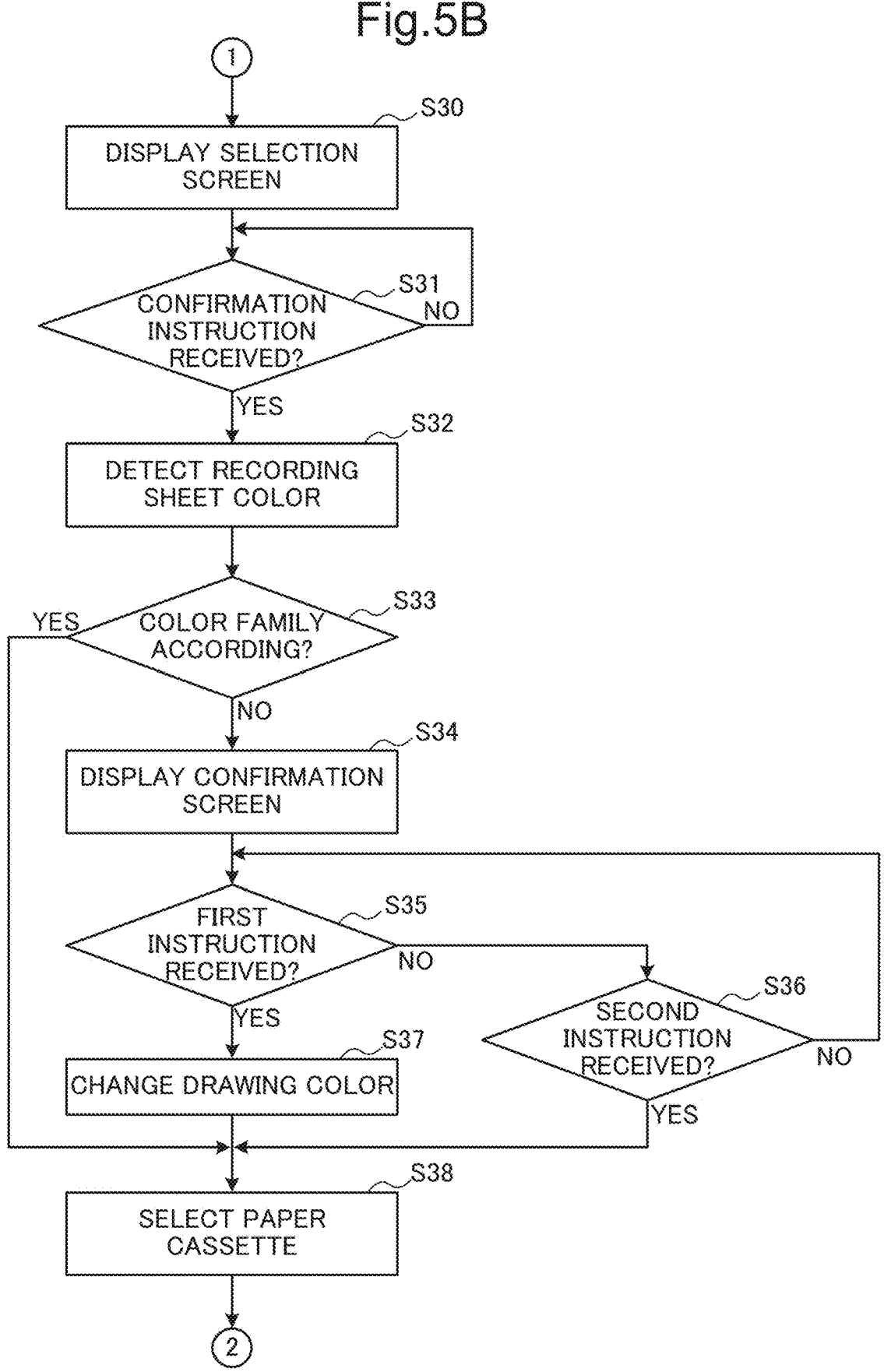
FIG. 5B is a flowchart branched from FIG. 5A, showing the sorting process.
Figure 6:
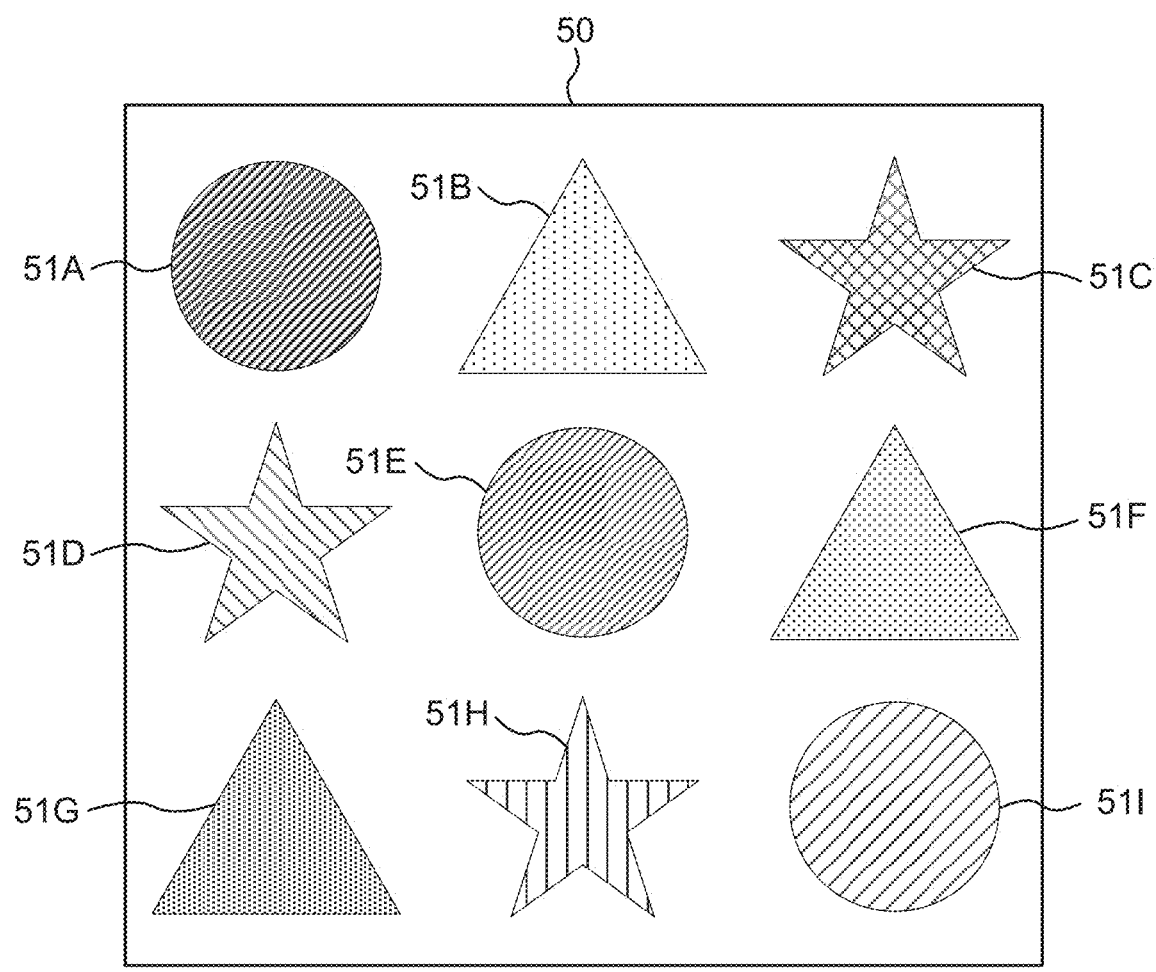
FIG. 6 is a schematic drawing showing examples of image data.
Figure 7:
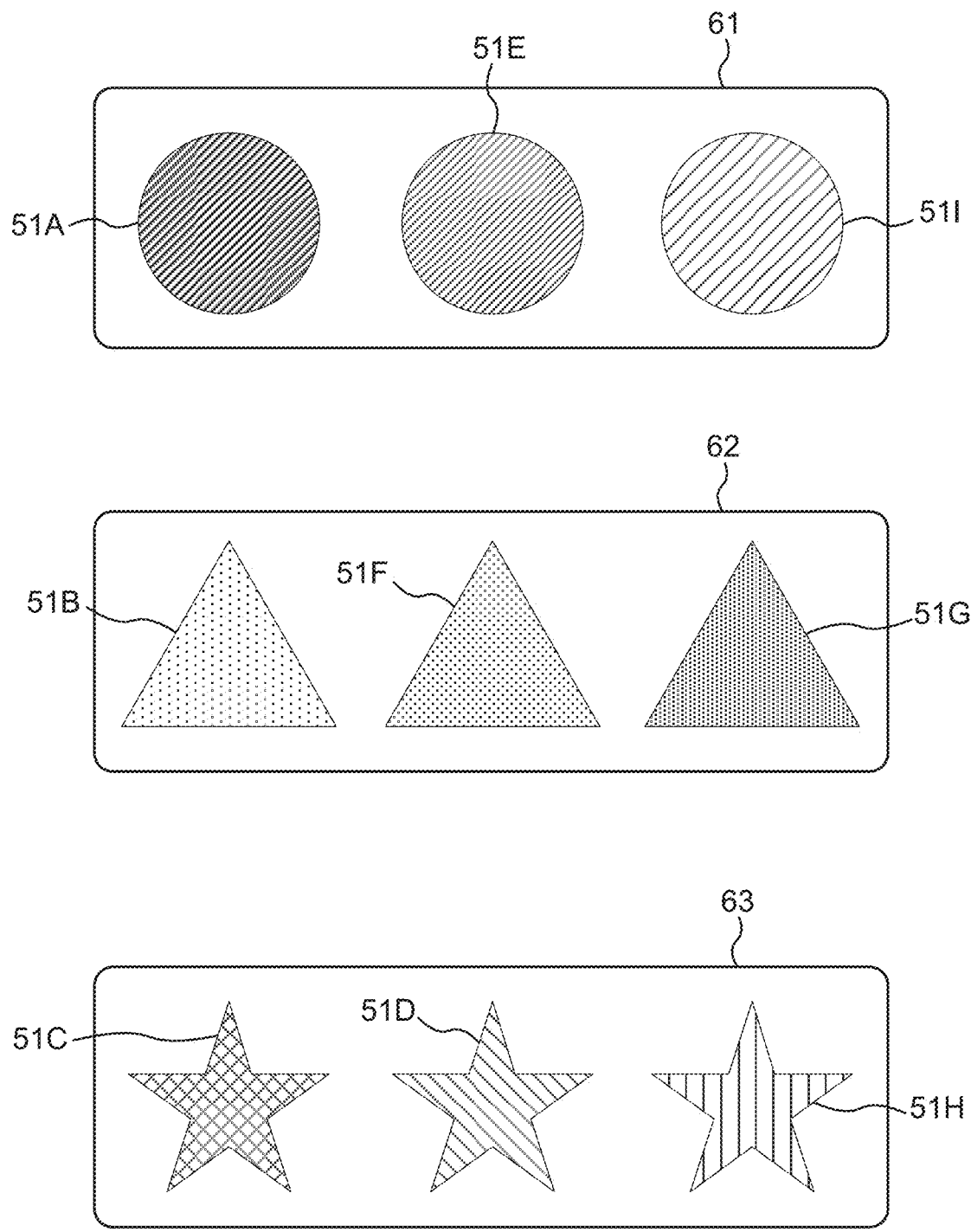
FIG. 7 is a schematic drawing showing an example of a classification result of the cut patterns.

FIG. 4 is a flowchart showing a cut pattern forming process. FIG. 5A and FIG. 5B are flowcharts each showing a sorting process. FIG. 6 illustrates examples of the image data. FIG. 7 illustrates an example of a classification result of the cut patterns. FIG. 8 illustrates examples of cut pattern arrangement. FIG. 9 illustrates an example of second data. FIG. 10 illustrates an example of an order list.

Figure 12:
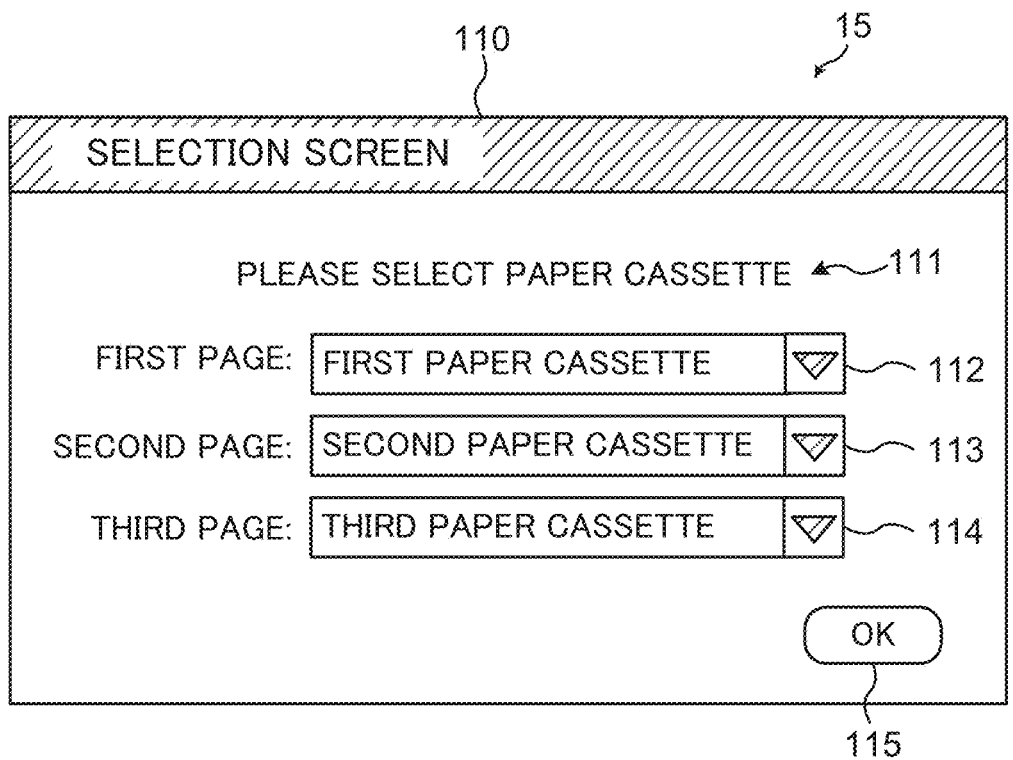
FIG. 12 is a schematic drawing showing an example of a selection screen.
Figure 13:
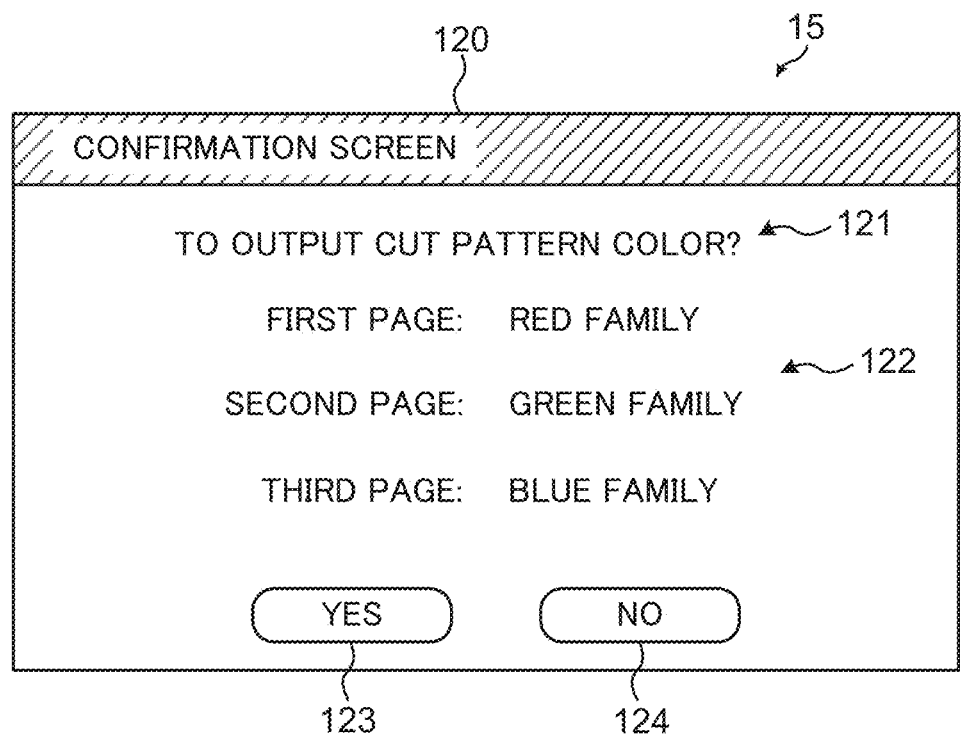
FIG. 13 is a schematic drawing showing an example of a confirmation screen.

FIG. 11 illustrates examples of output images. FIG. 12 illustrates an example of a selection screen. FIG. 13 illustrates an example of a confirmation screen. FIG. 14 and FIG. 15 each illustrate other examples of the output images. Hereunder, the operation performed by the image forming apparatus 1 to form the cut pattern will be described, with reference to FIG. 4 to FIG. 15. For the following description, it will be assumed that the power to the image forming apparatus 1 is on.

The user creates image data 50, for example in the portable document format (PDF), with the PC 23. Referring to FIG. 6, the created image data 50 represents cut patterns 51A to 51I. The cut pattern 51A has a circular shape and is colored in vermilion. The cut pattern 51E has a circular shape and is colored in red. The cut pattern 51I has a circular shape and is colored in orange.

The cut pattern 51B has a triangular shape and is colored in pale green. The cut pattern 51F has a triangular shape and is colored in yellowish green. The cut pattern 51G has a triangular shape and is colored in green. The cut pattern 51C has a star-type regular pentagonal shape (hereinafter, simple "star shape") and is colored in light purple. The cut pattern 51D has a star shape and is colored in light blue. The cut pattern 51H has a star shape and is colored in blue.

After creating the image data 50, the user inputs an instruction to form the cut pattern on the recording sheet P, through the operation device of the PC 23. Upon receipt of the instruction to form the cut pattern, the controller of the PC 23 generates job data in which the image data 50 and the instruction to form the cut pattern are described in PDL, using a printer driver stored in the storage device of the PC 23, and transmits the generated job data to the image forming apparatus 1, through the communication device of the PC 23.

Upon receipt of the job data through the communication device 22, the controller 10 of the image forming apparatus 1 starts to form the cut pattern. Referring to FIG. 4, the controller 10 analyzes, in the cut pattern forming operation, the content data and commands defined by PDL describing the job data, using the analysis program stored in the HDD 18, and generates first data of the intermediate format, representing the analysis result (step S11).

After step S11, the controller 10 performs sorting operation of step S12. In the sorting operation, as shown in FIG. 5A, the controller 10 extracts information indicating the cut pattern 51A to 51I from the first data (step S21). After step S21, the controller 10 identifies the color and the shape of the cut patterns 51A to 51I, according to the extracted information (step S22). after step S22, the controller 10 classifies the cut patterns 51A to 51I, by putting the cut patterns having the color of the same family and the same shape in the same group, according to the classification information 30 stored in the HDD 18 (step S23). When the controller 10 classifies the cut patterns at step S23 according to the classification information 30, a plurality of cut patterns of the color of the same family, and of the same color, are also classified as the cut patterns of the color of the same family.

Referring to FIG. 7, in this case the controller 10 classifies the cut patterns 51A, 51E, and 51I each having the color of the red family in a first group 61, classifies the cut patterns 51B, 51F, and 51G each having the color of the green family in a second group 62, and classifies the cut patterns 51C, 51D, and 51H each having the color of the blue family in a third group 63. After step S23, the controller 10 places the cut patterns 51A to 51I classified as above, on different pages by group (step S24).

Referring to FIG. 8, the controller 10 places the cut patterns 51A, 51E, and 51I of the first group 61 in this order, on a first page 71, places the cut patterns 51B, 51F, and 51G of the second group 62 in this order, on a second page 72, and places the cut patterns 51C, 51D, and 51H of the third group 63 in this order, on a third page 73.

In this process, the controller 10 detects a blank region on each page, and places the cut patterns 51A to 51I such that the blank region between the cut patterns adjacent to each other becomes smallest. The detection method of the blank region is not specifically limited. For example, the controller 10 may detect a region where a color is not designated, or a region where the transparency is equal to or higher than a predetermined threshold (e.g., region of 100% in transparency), as the blank region.

After step S24, the controller 10 generates a first to a ninth drawing commands for drawing cutting lines 74A to 74I, indicated in broken lines, respectively representing the contour of the cut patterns 51A to 51I placed as above (step S25). The positions where the cutting lines 74A to 74I are to be drawn are not specifically limited. For example, the controller 10 may draw the cutting lines 74A to 74I at the boundary between each of the cut patterns 51A to 51I and the blank region, or a position away from the boundary by a predetermined distance. At this point, the controller 10 sets the drawing color for the first to the ninth drawing commands to "colorless".

(1) When Each Family of the Colors of the Cut Patterns 51A to 51I Accords with One of the Families of the Detected Color of the Recording Sheet P After step S25, the controller 10 detects the color of the recording sheet P stored in the first paper cassette 14A to the third paper cassette 14C, according to the signals respectively outputted from the first detection device 30A to the third detection device 30C (step S26). It will be assumed here that red recording sheets P are stored in the first paper cassette 14A, blue recording sheets P are stored in the second paper cassette 14B, and that green recording sheets P are stored in the third paper cassette 14C.

Accordingly, the controller 10 detects "red" of the red family as the color of the recording sheet P stored in the first paper cassette 14A, detects "blue" of the blue family as the color of the recording sheet P stored in the second paper cassette 14B, and detects "green" of the green family as the color of the recording sheet P stored in the third paper cassette 14C. After step S26, the controller 10 decides whether there is a page on which the cut pattern of the color of the family that discords with the family of the detected color is placed (hereinafter, simply "discording page") (step S27).

In this example, since the family of the colors of the cut patterns 51A to 51I accords with one of the families of the detected colors, the controller 10 decides that there is no discording page (NO at step S27), and selects the paper cassette from which the color of the family that accords with the family of the colors of the cut patterns placed on the page has been detected, with respect to each of the pages (step S28). More specifically, the controller 10 selects the first paper cassette 14A with respect to the first page 71, selects the third paper cassette 14C with respect to the second page 72, and selects the second paper cassette 14B with respect to the third page 73. Here, when all the cut patterns placed on the same page have the color of the same family, and also the same color, the controller 10 may (A) select the paper cassette from which the color of the family, in which the color of the cut pattern placed on the page is included, has been detected, or more strictly, (B) select the paper cassette from which the same color as the color of the cut pattern placed on the page has been detected.

Referring to FIG. 9, after step S28 the controller 10 generates second data 81 to 83 of the intermediate format, each indicating the paper cassette selected, the color detected from the paper cassette, and the drawing command, with respect to each of the pages (step S29). More specifically, the controller 10 generates, as the second data 81 for the first page 71, the data indicating "first paper cassette 14A", "red", and the first to the third drawing commands respectively indicating the cutting lines 74A, 74E, and 74I.

The controller 10 generates, as the second data 82 for the second page 72, the data indicating "third paper cassette 14C", "green", and the fourth to the sixth drawing commands respectively indicating the cutting lines 74B, 74F, and 74G. Likewise, the controller 10 generates, as the second data 83 for the third page 73, the data indicating "second paper cassette 14B", "blue", and the seventh to the ninth drawing commands respectively indicating the cutting lines 74C, 74D, and 74H. Upon completing the operation of step S29, the controller 10 finishes the sorting operation of step S12.

Referring to FIG. 10, after the sorting operation the controller 10 generates order lists 91 to 93 of the subordinate format on the basis of the second data 81 to 83, with respect to each of the pages (step S13). More specifically, the controller 10 generates, as the order list 91 for the first page 71, a list including tag values respectively indicating the first to the third drawing commands. The controller 10 generates, as the order list 92 for the second page 72, a list including tag values respectively indicating the fourth to the sixth drawing commands. The controller 10 generates, as the order list 93 for the third page 73, a list including tag values respectively indicating the seventh to the ninth drawing commands.

After step S13, the controller 10 causes the paper feeding device 14 to deliver the recording sheet P stored in one of the first paper cassette 14A to the third paper cassette 14C for each of the pages, according to the second data 81 to 83, and causes the image forming device 12 to form the cutting lines 74A to 74I on the recording sheet P delivered as above, with respect to each of the pages, according to the order lists 91 to 93 (step S14).

More specifically, as shown in FIG. 11, the controller 10 causes the paper feeding device 14 to deliver the red recording sheet P1 from the first paper cassette 14A according to the second data 81, and causes the image forming device 12 to form an output image including the cutting lines 74A, 74E, and 74I on the recording sheet P1 delivered, according to the order list 91. The controller 10 causes the paper feeding device 14 to deliver the green recording sheet P2 from the third paper cassette 14C according to the second data 82, and causes the image forming device 12 to form an output image including the cutting lines 74B, 74F, and 74G on the recording sheet P2 delivered, according to the order list 92.

Likewise, the controller 10 causes the paper feeding device 14 to deliver the blue recording sheet P3 from the second paper cassette 14B according to the second data 83, and causes the image forming device 12 to form an output image including the cutting lines 74C, 74D, and 74H on the recording sheet P3 delivered, according to the order list 93. In this case, the drawing color of the first drawing command to the ninth drawing command is "colorless", and therefore the controller 10 restricts the image forming device 12 from outputting a color to the regions surrounded by the cutting lines 74A to 74I.

(2) When Each Family of the Colors of the Cut Patterns 51A to 51I Discords with the Family of the Detected Color of the Recording Sheet P In contrast, for example when white recording sheets P are stored in all of the first paper cassette 14A to the third paper cassette 14C, the controller 10 detects "white" of the white family, as the color of the recording sheet P stored in the first paper cassette 14A to the third paper cassette 14C, at step S26.

Since each family of the colors of the cut patterns 51A to 51I discords with all the families of the detected colors, the controller 10 decides that there are discording pages (YES at step S27), and causes the display device 15 to display a selection screen 110 for urging the user to select the paper cassette for the discording page, as shown in FIG. 5B and FIG. 12 (step S30).

The controller 10 causes the display device 15 to display, in the selection screen 110, a message 111 as "Please select paper cassette", fields 112 to 114 for displaying the paper cassette selected for the first page 71 to the third page 73, which are the discording pages, and a soft key 115 for inputting a confirmation instruction to confirm the selection inputted. After step S30, the controller 10 stands by for a touch on the soft key 115. During the standby, the controller 10 repeats the decision that the confirmation instruction has not been received (NO at step S31).

It is assumed here that the user has inputted a selection instruction through the touch panel 16B, to selected the first paper cassette 14A for the first page 71, the second paper cassette 14B for the second page 72, and the third paper cassette 14C for the third page 73, without changing the recording sheet P stored in the first paper cassette 14A to the third paper cassette 14C. Upon receipt of the selection instruction through the touch panel 16B, the controller 10 causes the display device 15 to display the content of the selection instruction received, in the fields 112 to 114. Then the user confirms the display in the fields 112 to 114, and touches the soft key 115.

Upon detecting the touch on the soft key 115 through the touch panel 16B, the controller 10 decides that the confirmation instruction has been received (YES at step S31), and detects the color of the recording sheet P stored in the first paper cassette 14A to the third paper cassette 14C, indicated by the selection instruction received, according to the signals respectively outputted from the first detection device 30A to the third detection device 30B (step S32). In this example, the controller 10 detects "white" of the white family, as the color of the recording sheet P stored in the first paper cassette 14A to the third paper cassette 14C.

After step S32, the controller 10 decides whether the family of the colors of the cut patterns placed on the discording page accords with the family of the color detected from the paper cassette selected with respect to the discording page (step S33). More specifically, the controller 10 compares the family of the colors of the cut patterns 51A, 51E, and 51I placed on the first page 71, with the family of the color detected by the first detection device 30A, compares the family of the colors of the cut patterns 51B, 51F, and 51G placed on the second page 72, with the family of the color detected by the second detection device 30B, and compares the family of the colors of the cut patterns 51C, 51D, and 51H placed on the third page 73, with the family of the color detected by the third detection device 30C.

Since the families of the colors of the cut patterns 51A to 51I discord with the white family including "white" in this case, the controller 10 decides that the families of the colors of the cut patterns on the discording pages discord with the family of the detected color (NO at step S33), and causes the display device 15 to display a confirmation screen 120 for confirming whether the colors of the cut patterns on the discording pages are to be outputted, as shown in FIG. 13 (step S34).

The controller 10 causes the display device 15 to display, on the confirmation screen 120, a message 121 as "To output cut pattern color?", character strings 122 representing the families of the colors of the cut patterns respectively placed on the first page 71 to the third page 73, a soft key 123 for inputting a first instruction to output the color of the cut pattern, and a soft key 124 for inputting a second instruction to restrict the color of the cut pattern from being outputted. After step S30, the controller 10 stands by for the touch on the soft key 123 or the soft key 124. During the standby, the controller 10 repeats the decision that neither of the first instruction and the second instruction has been received (NO at step S35 and step S36).

(2-1) When the First Instruction is Received

When the user touches the soft key 123, the controller 10 decides that the first instruction has been received (YES at step S35), and changes the drawing color of the drawing command for the discording page to the color of the cut pattern placed on the discording page (step S37). More specifically, the controller 10 changes the drawing color of the first drawing command from "colorless" to "vermilion", changes the drawing color of the second drawing command from "colorless" to "red", and changes the drawing color of the third drawing command from "colorless" to "orange".

The controller 10 changes the drawing color of the fourth drawing command from "colorless" to "pale green", changes the drawing color of the fifth drawing command from "colorless" to "yellowish green", and changes the drawing color of the sixth drawing command from "colorless" to "green". Further, the controller 10 changes the drawing color of the seventh drawing command from "colorless" to "light purple", changes the drawing color of the eighth drawing command from "colorless" to "light blue", and changes the drawing color of the ninth drawing command from "colorless" to "blue".

After step S37, the controller 10 selects the paper cassette, with respect to each of the pages (step S38). At this point, the controller 10 selects, for the discording pages, the paper cassettes selected for the respective discording pages. More specifically, the controller 10 selects the first paper cassette 14A for the first page 71, selects the second paper cassette 14B for the second page 72, and selects the third paper cassette 14C for the third page 73. Here, in the case where there is a page that is not a discording page, the controller 10 selects, like the operation at step S28, the paper cassette from which the color of the family that accords with the family of the color of the cut pattern on that page has been detected, for the page that is not the discording page.

After step S38, the controller 10 performs the operation of step S29 referred to above. More specifically, the controller 10 generates, as the second data 81 for the first page 71, the data indicating "first paper cassette 14A", "white", and the first to the third drawing commands. The controller 10 generates, as the second data 82 for the second page 72, the data indicating "second paper cassette 14B", "white", and the fourth to the sixth drawing commands. The controller 10 generates, as the second data 83 for the third page 73, the data indicating "third paper cassette 14C", "white", and the seventh to the ninth drawing commands.

After step S29, the controller 10 performs the operation of step S13 referred to above, to generate the orders list 91 to 93 for the respective pages. After step S13, the controller 10 performs the operation of step S14 referred to above. More specifically, as shown in FIG. 14, the controller 10 causes the paper feeding device 14 to deliver the white recording sheet P4 from the first paper cassette 14A indicated by the second data 81, and causes the image forming device 12 to form the output image including the cutting lines 74A, 74E, and 74I on the recording sheet P4 delivered, according to the order list 91. In this case, the drawing colors of the first to the third drawing commands are vermilion, red, and orange, respectively, and therefore the controller 10 causes the image forming device 12 to output vermilion, red, and orange, to the regions respectively surrounded by the cutting lines 74A, 74E, and 74I.

The controller 10 causes the paper feeding device 14 to deliver the white recording sheet P5 from the second paper cassette 14B indicated by the second data 82, and causes the image forming device 12 to form the output image including the cutting lines 74B, 74F, and 74G on the recording sheet P5 delivered, according to the order list 92. In this case, the drawing colors of the fourth to the sixth drawing commands are pale green, yellowish green, and green, respectively, and therefore the controller 10 causes the image forming device 12 to output pale green, yellowish green, and green, to the regions respectively surrounded by the cutting lines 74B, 74F, and 74G.

The controller 10 causes the paper feeding device 14 to deliver the white recording sheet P6 from the third paper cassette 14C indicated by the second data 83, and causes the image forming device 12 to form the output image including the cutting lines 74C, 74D, and 74H on the recording sheet P6 delivered, according to the order list 93. In this case, the drawing colors of the seventh to the ninth drawing commands are light purple, light blue, and blue, respectively, and therefore the controller 10 causes the image forming device 12 to output light purple, light blue, and blue, to the regions respectively surrounded by the cutting lines 74C, 74D, and 74H.

(2-2) When the Second Instruction is Received

When the user touches the soft key 124, the controller 10 decides that the second instruction has been received (YES at step S36), and performs the operation of step S38 referred to above, without changing the drawing colors. More specifically, the controller 10 selects the first paper cassette 14A for the first page 71, selects the second paper cassette 14B for the second page 72, and selects the third paper cassette 14C for the third page 73.

After step S38, the controller 10 performs the operation of step S29 referred to above. More specifically, the controller 10 generates, as the second data 81 for the first page 71, the data indicating "first paper cassette 14A", "white", and the first to the third drawing commands. The controller 10 generates, as the second data 82 for the second page 72, the data indicating "second paper cassette 14B", "white", and the fourth to the sixth drawing commands. The controller 10 generates, as the second data 83 for the third page 73, the data indicating "third paper cassette 14C", "white", and the seventh to the ninth drawing commands.

After step S29, the controller 10 performs the operation of step S13 referred to above, to generate the orders list 91 to 93 for the respective pages. After step S13, the controller 10 performs the operation of step S14 referred to above. More specifically, as shown in FIG. 15, the controller 10 causes the paper feeding device 14 to deliver the white recording sheet P7 from the first paper cassette 14A indicated by the second data 81, and causes the image forming device 12 to form the output image including the cutting lines 74A, 74E, and 74I on the recording sheet P7 delivered, according to the order list 91.

The controller 10 causes the paper feeding device 14 to deliver the white recording sheet P8 from the second paper cassette 14B indicated by the second data 82, and causes the image forming device 12 to form the output image including the cutting lines 74B, 74F, and 74G on the recording sheet P8 delivered, according to the order list 92. The controller 10 causes the paper feeding device 14 to deliver the white recording sheet P9 from the third paper cassette 14C indicated by the second data 83, and causes the image forming device 12 to form the output image including the cutting lines 74C, 74D, and 74H on the recording sheet P9 delivered, according to the order list 93. In this case, the drawing color of the first drawing command to the ninth drawing command is "colorless", and therefore the controller 10 restricts the image forming device 12 from outputting a color to the regions respectively surrounded by the cutting lines 74A to 74I.

Here, in the case where the user replaces, upon confirming the selection screen 110, the recording sheet P stored in the first paper cassette 14A with the red recording sheet P, replaces the recording sheet P stored in the second paper cassette 14B with the green recording sheet P, and replaces the recording sheet P stored in the third paper cassette 14C with the blue recording sheet P, inputs the selection instruction through the touch panel 16B as above, and then touches the soft key 115, the controller 10 decides that the family of the colors of the cut patterns on the discording page accords with the family of the detected colors (YES at step S33), and performs the operation of step S38 as above.

According to the foregoing embodiment, upon receipt of the image data 50 representing the cut patterns 51A to 51I through the communication device 22, the controller 10 classifies the cut patterns 51A to 51I by putting the cut patterns having the color of the same family and the same shape in the same group, according to the classification information 30, places the groups each including the classified cut patterns 51A to 51I, on different pages, generates the cutting lines 74A to 74I representing the contour of the cut patterns 51A to 51I placed as above, selects the paper cassette, from which the color of the recording sheet P, of the color family that accords with the color family of the placed cut patterns, has been detected, with respect to each of the pages, causes the paper feeding device 14 to deliver the recording sheet P from the selected paper cassette, with respect to each of the pages, and causes the image forming device 12 to form the cutting lines 74A to 74I on the recording sheet P, with respect to each of the pages.

With the mentioned arrangement, the cutting line of the cut pattern is formed on the recording sheet P having the color of the same family as the color of the cut pattern, and therefore the image forming device 12 is not required to output the color of the cut pattern, although a cutout image of exactly the same color as the color of the cut pattern is unable to be obtained. Accordingly, the consumption of color materials necessary for outputting the color of the cut pattern can be reduced. Further, when the number of colors of the cut pattern large, the consumption of the recording sheet P on which the cut pattern is formed can be reduced, compared with the case where the cutting line of the cut pattern is formed on the recording sheet P of the same color as the color of the cut pattern.

For example, when a plurality of cut patterns different in color from each other are to be formed on the recording sheet, normally the same number of color materials, such as a toner, as the number of colors of the cut pattern are employed, and therefore the consumption of the color materials is increased. With the technique according to the background art, the mentioned drawback is unable to be solved, although a region on the recording sheet where the cut pattern is not formed (hereinafter, "unformed region") can be reduced. However, the arrangement according to this embodiment enables the consumption of the color materials, necessary for outputting the color of the cut pattern, to be reduced.

According to the foregoing embodiment, to classify the plurality of cut patterns, and select the paper cassette for each of the pages, (I) the controller 10 classifies the plurality of cut patterns by putting the cut patterns having the color of the same family in the same group, and selects the paper cassette, from which the color of the recording medium, of the color family that accords with the color family of the cut patterns placed, has been detected by the first to the third detection devices 30A, 30B, and 30C, with respect to each of the pages. Alternatively, (II) the controller 10 may classify the plurality of cut patterns by putting the cut patterns of the same color in the same group, and select the paper cassette, from which the color of the recording medium that accords with the color of the cut patterns placed has been detected by the first to the third detection devices 30A, 30B, and 30C, with respect to each of the pages. Hereunder, a preferable aspect attained from the case of (II), because of the difference from the case of (I) above, will be described.

Figure 16:
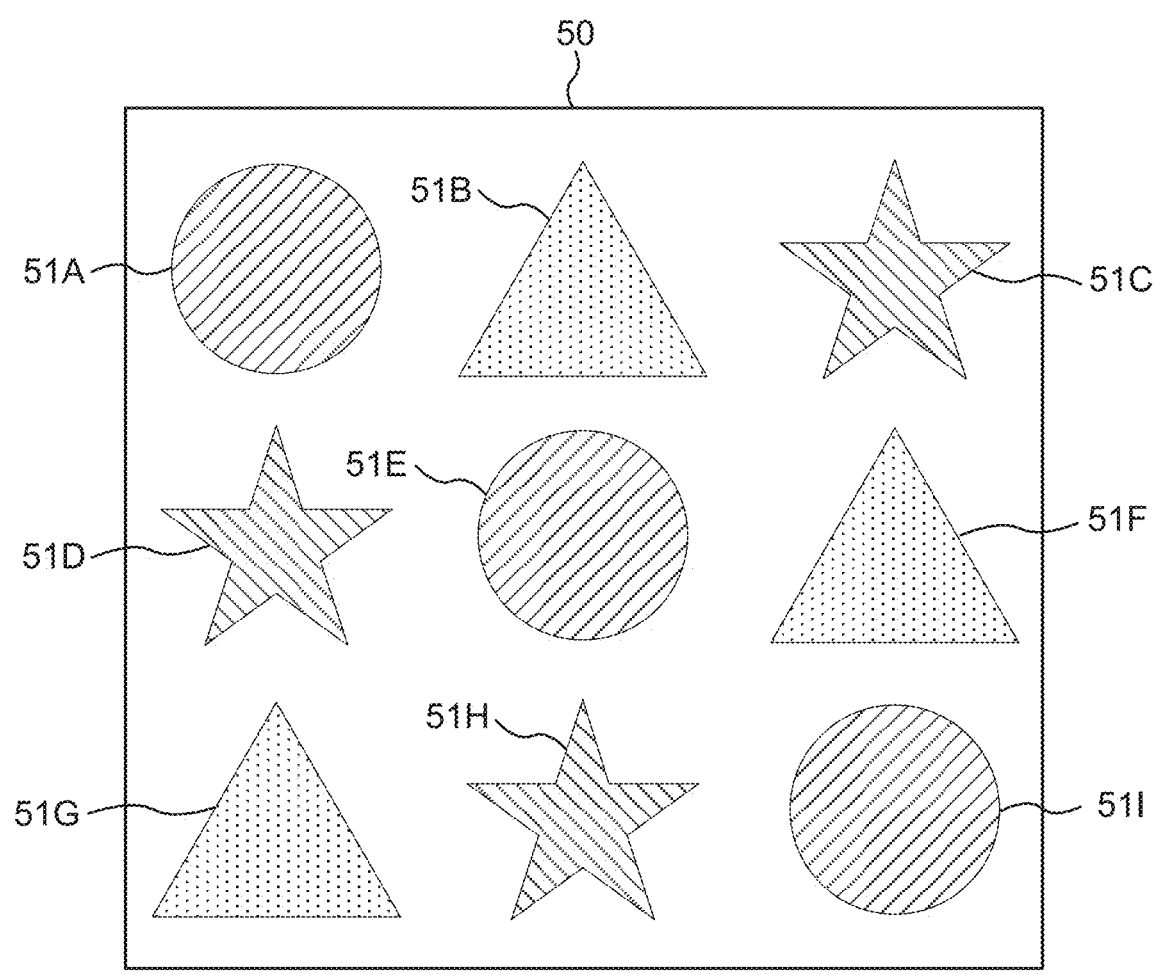
FIG. 16 is a schematic drawing showing examples of image data.

For the description of the case of (II) above, it will be assumed that the user has created the image data 50 as shown in FIG. 16, with the PC 23. The created image data 50 represents the cut patterns 51A to 51I. In this example, the cut patterns 51A, 51E, and 51I have a circular shape and are colored in red. The cut patterns 51B, 51F, and 51G have a triangular shape and are colored in green. The cut patterns 51C, 51D, and 51H have a star shape and are colored in blue.

Figure 17:
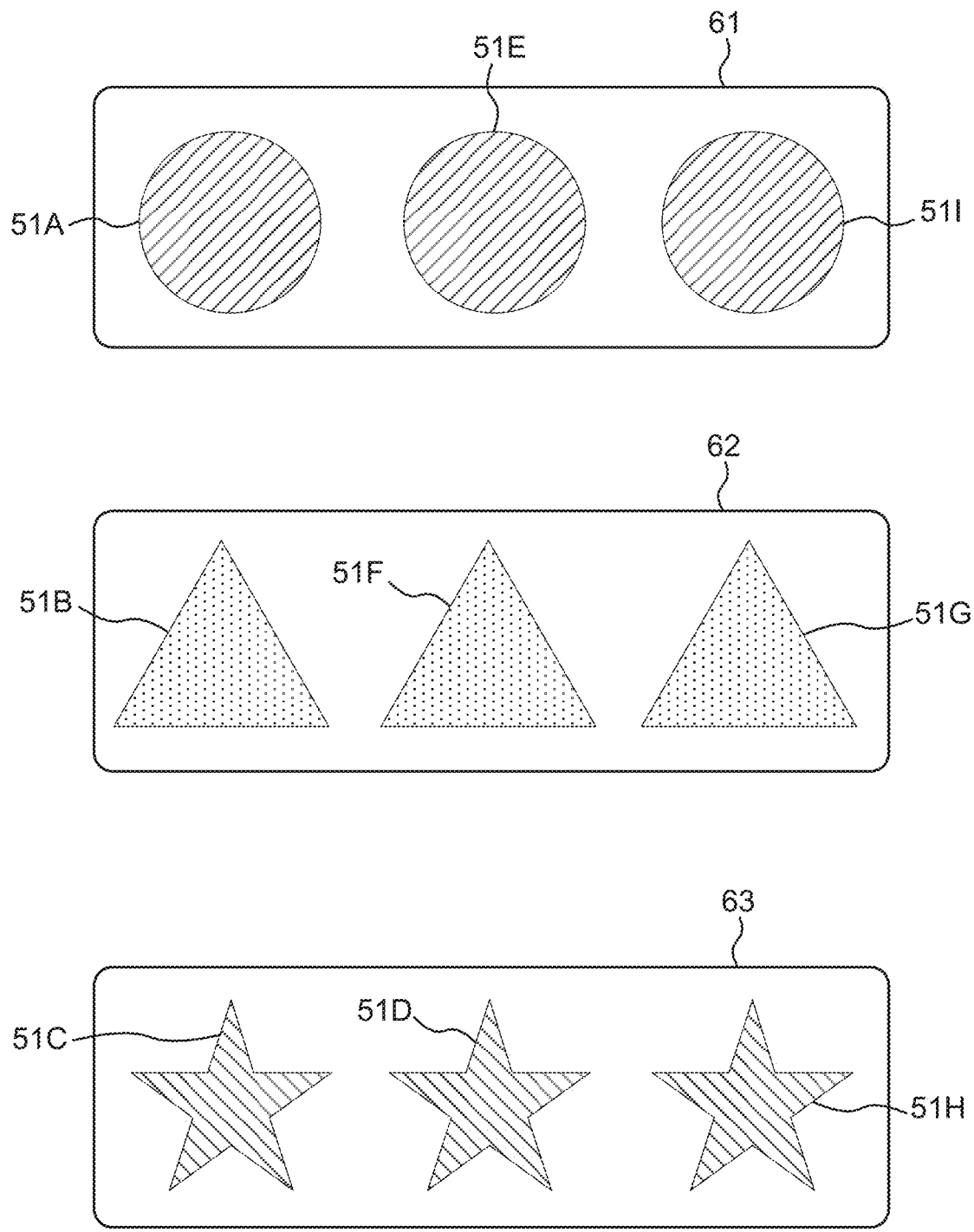
FIG. 17 is a schematic drawing showing an example of a classification result of the cut patterns.

To classify the cut patterns according to the classification information 30 at step S23 shown in FIG. 5A, when the plurality of cut patterns are of the color of the same family, and also of the same color, the controller 10 classifies the cut patterns as those of the color of the same family. In this example, as shown in FIG. 17, the controller 10 classifies the red cut patterns 51A, 51E, and 51I into the first group 61, classifies the green cut patterns 51B, 51F, and 51G into the second group 62, and classifies the blue cut patterns 51C, 51D, and 51H into the third group 63. After step S23, the controller 10 places the cut patterns 51A to 51I classified as above, on different pages by group (step S24).

As shown in FIG. 18, the controller 10 places the cut patterns 51A, 51E, and 51I of the same color included in the first group 61 in this order, on the first page 71, places the cut patterns 51B, 51F, and 51G of the same color included in the second group 62 in this order, on the second page 72, and places the cut patterns 51C, 51D, and 51H of the same color included in the third group 63 in this order, on the third page 73.

Upon deciding at step S27 that there is no discording page, on which the cut pattern of the color that discords with the detected color is placed (NO at step S27), the controller 10 selects the paper cassette from which the color that accords with the color of the placed cut pattern has been detected, with respect to each of the pages (step S28).

In contrast, upon deciding that there are one or more discording pages (YES at step S27), the controller 10 causes the display device 15 to display the selection screen 110 as shown in FIG. 5B and FIG. 12, to urge the user to select the paper cassette for the discording page (step S30). Thereafter, the controller 10 performs the operation of steps S31 and S32, as in the case of (I) above.

Then at step S33, the controller 10 decides whether the color of the cut patterns placed on the discording page accords with the color detected from the paper cassette selected with respect to the discording page. More specifically, the controller 10 compares the color of the cut patterns 51A, 51E, and 51I placed on the first page 71, with the color detected by the first detection device 30A, compares the color of the cut patterns 51B, 51F, and 51G placed on the second page 72, with the color detected by the second detection device 30B, and compares the color of the cut patterns 51C, 51D, and 51H placed on the third page 73, with the color detected by the third detection device 30C.

Figure 19:
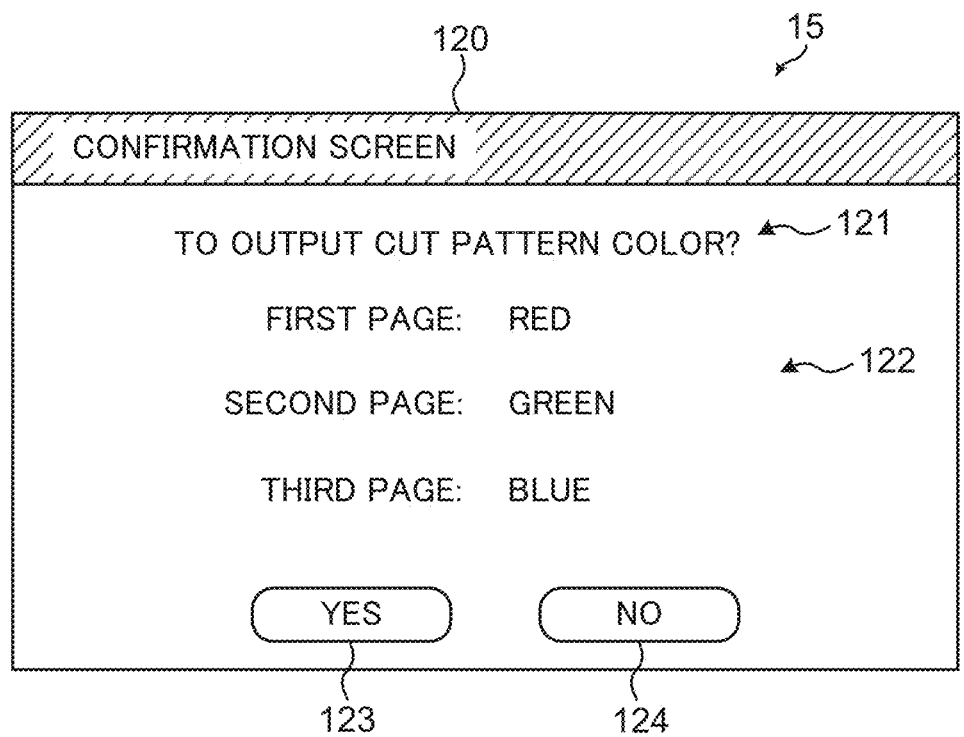
FIG. 19 is a schematic drawing showing an example of the confirmation screen.

When the controller 10 decides that the color of the cut patterns on the discording page discords with the detected color (NO at step S33), the controller 10 causes the display device 15 to display the confirmation screen 120 for confirming whether the colors of the cut patterns on the discording pages are to be outputted, as shown in FIG. 19 (step S34). On the confirmation screen 120, the controller 10 causes the display device 15 to display the message 121 as "To output cut pattern color?", the character strings 122 representing the colors of the cut patterns respectively placed on the first page 71 to the third page 73, the soft key 123 for inputting the first instruction to output the color of the cut pattern, and the soft key 124 for inputting a second instruction to restrict the color of the cut pattern from being outputted.

After performing the operation of step S38 (FIG. 5B) and then the operation of step S29 (FIG. 5A), the controller 10 performs the operation of steps S13 and S14 shown in FIG. 4. At step S14, the controller 10 causes the paper feeding device 14 to deliver the white recording sheet P4 from the first paper cassette 14A indicated by the second data 81, and causes the image forming device 12 to form the output image including the cutting lines 74A, 74E, and 74I on the recording sheet P4 delivered, according to the order list 91. In this case, the drawing colors of the first to the third drawing commands are red as shown in FIG. 20, and therefore the controller 10 causes the image forming device 12 to output red to the regions respectively surrounded by the cutting lines 74A, 74E, and 74I.

The controller 10 causes the paper feeding device 14 to deliver the white recording sheet P5 from the second paper cassette 14B indicated by the second data 82, and causes the image forming device 12 to form the output image including the cutting lines 74B, 74F, and 74G on the recording sheet P5 delivered, according to the order list 92. In this case, the drawing colors of the fourth to the sixth drawing commands are green, and therefore the controller 10 causes the image forming device 12 to output green to the regions respectively surrounded by the cutting lines 74B, 74F, and 74G.

The controller 10 causes the paper feeding device 14 to deliver the white recording sheet P6 from the third paper cassette 14C indicated by the second data 83, and causes the image forming device 12 to form the output image including the cutting lines 74C, 74D, and 74H on the recording sheet P6 delivered, according to the order list 93. In this case, the drawing colors of the seventh to the ninth drawing commands are blue, and therefore the controller 10 causes the image forming device 12 to output blue to the regions respectively surrounded by the cutting lines 74C, 74D, and 74H.

As described above, in the case of (II) above, the controller 10 classifies the cut patterns 51A to 51I, upon receipt of the image data 50 representing the cut patterns 51A to 51I through the communication device 22, by putting the cut patterns having the same color and the same shape in the same group, places the groups each including the classified cut patterns on different pages, generates the cutting lines 74A to 74I representing the contour of the cut patterns 51A to 51I placed as above, selects the paper cassette, from which the color of the recording sheet P that accords with the color of the placed cut patterns has been detected, with respect to each of the pages, causes the paper feeding device 14 to deliver the recording sheet P from the selected paper cassette, with respect to each of the pages, and causes the image forming device 12 to form the cutting lines 74A to 74I on the recording sheet P, with respect to each of the pages.

Thus, in the case of (II) above, the cutting line of the cut pattern is formed on the recording sheet P of the same color as that of the cut pattern. Therefore, the cutout image of exactly the same color as that of the cut pattern can be obtained, and the image forming device 12 is not required to output the color of the cut pattern, which leads to reduced consumption of the color material necessary for outputting the color of the cut pattern.

According to the foregoing embodiment (both (I) and (II) inclusive), when there is a discording page, the controller 10 receives the selection instruction for selecting the paper cassette for the discording page, through the operation device 16, and causes the paper feeding device 14 to deliver the recording sheet P stored in the paper cassette selected for the discording page.

Therefore, when the recording sheet P of the color of the same family as the family of the color of the cut pattern, or the recording sheet P of the same color as that of the cut pattern, is stored in none of the plurality of paper cassettes, the user can select the paper cassette, which is the source of the recording sheet. Accordingly, for example, the user can place the recording sheet P of the same color as that of the cut pattern in one of the paper cassettes, and then select that paper cassette, or select the paper cassette in which the recording sheet P of a color of a family similar to the family of the color of the cut pattern, or the recording sheet P of a color similar to that of the cut pattern, is stored. Consequently, the user-friendliness of the apparatus can be improved.

According to the foregoing embodiment, in the case where the controller 10 receives the first instruction to output the color of the cut pattern through the operation device 16, when the family of the color of the cut pattern placed on the discording page discords with the family of the color detected from the paper cassette for the discording page, or when the color of the cut pattern placed on the discording page discords with the color detected from the paper cassette for the discording page, the controller 10 causes the image forming device 12 to form the cutting lines 74A to 74I generated for the discording pages on the recording sheet P, and to output the color of the cut patterns to the regions respectively surrounded by the cutting lines 74A to 74I.

Accordingly, when the recording sheet P, of the color of the family that accords with the family of the color of the cut pattern placed on the discording page, is unavailable, the user can output the color of the cut pattern to the recording sheet P When the recording sheet P, of the color that accords with the color of the cut pattern placed on the discording page, is unavailable, the user can output the color of the cut pattern to the recording sheet P Therefore, the user can surely acquire the cut pattern of the desired color.

According to the foregoing embodiment, further, the controller 10 classifies the cut patterns 51A to 51I by putting the cut patterns of the same shape in the same group. Thus, since the cut patterns of the same shape are formed on the same recording sheet P, the unformed region on the recording sheet P can be reduced, and also the user can cut out the patterns more easily, compared with the case where the cut patterns of different shapes are formed on the same recording sheet P Variations Although the controller 10 causes the image forming device 12 to form the cutting lines 74A to 74I in broken lines in the foregoing embodiment, the disclosure is not limited to such an arrangement. For example, the controller 10 may cause the image forming device 12 to form the cutting line 74A to 74I in dotted lines. Alternatively, the image forming apparatus 1 may further include a cutting mechanism for cutting the recording sheet P, such as a laser cutter or a pen-type cutter knife, and the controller 10 may cause the cutting mechanism to form perforations along the cutting lines 74A to 74I, or to cut the recording sheet P along the cutting lines 74A to 74I.

In the foregoing embodiment, the controller 10 classifies the cut patterns 51A to 51I by putting the cut patterns of the same color or of the color of the same family, and of the same shape, in the same group. However, the disclosure is not limited to such an arrangement. For example, the controller 10 may put the cut patterns of the same color or of the color of the same family in the same group, irrespective of the shape, to classify the cut patterns 51A to 51I.

Figure 21:
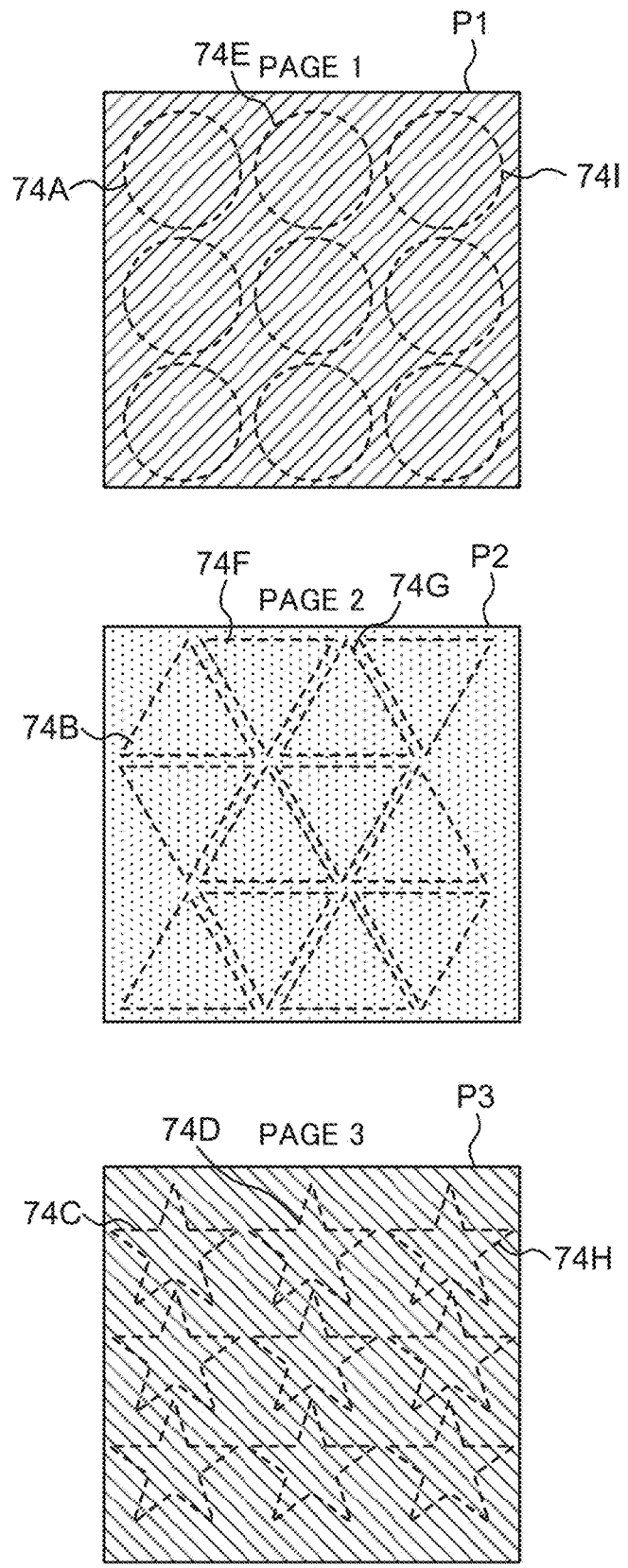
FIG. 21 is a schematic drawing showing other examples of the output images.

In the foregoing embodiment, the controller 10 causes the image forming device 12 to form the output images only including the cutting lines 74A to 74I corresponding to the respective cut patterns 51A to 51I represented by the image data 50. However, the disclosure is not limited to such an arrangement. FIG. 21 illustrates other examples of the output images. Referring to FIG. 21, the controller 10 may, for example, cause the image forming device 12 to form, on the recording sheet P1, the output image including a maximum number of the same cutting lines as the cutting lines 74A, 74E, and 74I that can be formed on the recording sheet P1.

The controller 10 may cause the image forming device 12 to form, on the recording sheet P2, the output image including a maximum number of the same cutting lines as the cutting lines 74B, 74F, and 74G that can be formed on the recording sheet P2. The controller 10 may cause the image forming device 12 to form, on the recording sheet P3, the output image including a maximum number of the same cutting lines as the cutting lines 74C, 74D, and 74H that can be formed on the recording sheet P3. Such an arrangement contributes to reducing the unformed region on the recording sheet P, and further assures that the unformed region on the recording sheets P1 to P3 can be reduced.

Although the image data 50 in PDF is employed in the foregoing embodiment, the disclosure is not limited to such embodiment. The format of the image data 50 is not specifically limited, provided that the format is supported by the printer driver installed in the PC 23. The image data 50 may be, for example, of a format supported by a printer control language (PCL) printer driver, or supported by a postscript (PS) printer driver.

Although the toner is employed as the color material in the foregoing embodiment, the disclosure is not limited to such embodiment. For example, when the image forming apparatus 1 is an ink jet printer, the ink is employed as the color material.

Although the image forming device 12 is configured to form an image on the recording sheet P in the foregoing embodiment, the disclosure is not limited to such a configuration. The image forming device 12 may form an image on a different recording medium, other than the recording sheet. For example, an overhead projector (OHP) sheet may be employed, to form an image.

The disclosure may be modified in various manners, without limitation to the foregoing embodiments. For example, although the color MFP is taken up in the foregoing embodiments as an example of the image processing apparatus according to the disclosure, the disclosure is also applicable to various other image forming apparatuses, such as a monochrome MFP, a copier, and a facsimile machine.

Further, the configurations and processings described in the foregoing embodiments with reference to FIG. 1 to FIG. 21 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image input device that receives an input of image data;
   an image forming device that forms an image on a recording medium;
   a supply device including a plurality of cassettes, and configured to deliver the recording medium stored in the plurality of cassettes to the image forming device;
   a detection device that detects a color of the recording medium stored in the plurality of cassettes; and
   a control device including a processor, and configured to act, when the processor executes a control program, as a controller that:
   classifies, when the image data representing a plurality of cut patterns each having a color is inputted through the image input device, the plurality of cut patterns by putting the cut patterns having a color of a same family in a same group, according to predetermined classification information indicating a plurality of colors classified by color family;

places the groups each including the plurality of cut patterns classified, on different pages;

generates a cutting line representing a contour of each of the plurality of cut patterns placed;

selects the cassette, from which a color of the recording medium, of the color family that accords with the color family of the cut patterns placed, has been detected by the detection device, with respect to each of the pages;

causes the supply device to supply the recording medium from the selected cassette, with respect to each of the pages; and causes the image forming device to form the generated cutting line on the recording medium, with respect to each of the pages.

2. The image forming apparatus according to claim 1, further comprising a storage device in which the classification information is stored, wherein the controller classifies the plurality of cut patterns according to the classification information stored in the storage device.

3. The image forming apparatus according to claim 1, wherein the controller is configured to:

classify, when the image data representing the plurality of cut patterns each having a color is inputted through the image input device, the plurality of cut pattern by putting the cut patterns having the color of the same family, and the same color, in the same family;

place the groups each including the plurality of cut patterns classified, on different pages;

generate the cutting line representing the contour of each of the plurality of cut patterns placed;

select the cassette, from which the color of the recording medium, of the color family that accords with the color family of the cut patterns placed, has been detected by the detection device, with respect to each of the pages.

4. The image forming apparatus according to claim 1, further comprising an instruction input device through which an instruction of a user is inputted, wherein, when there is a page on which the cut pattern of a color of the family that discords with the family of the color of the recording medium, detected by the detection device, is placed, the controller receives a selection instruction for selecting the cassette for the discording page, through the instruction input device, and causes the supply device to supply the recording medium stored in the cassette designated by the selection instruction, for the discording page.

5. The image forming apparatus according to claim 1, wherein, when the family of the color of the cut pattern placed on the discording page discords with the family of the color of the recording medium stored in the cassette designated by the selection instruction, which is detected by the detection device and when the controller receives an instruction to output the color of the cut pattern, through the instruction input device, the controller causes the image forming device to form the cutting line generated for the discording page, on the recording medium, and to output the color of the cut pattern to a region surrounded by the cutting line.

6. The image forming apparatus according to claim 1, wherein the controller generates, when causing the image forming device to form the generated cutting line on the recording medium with respect to each of the pages, an output image including a maximum number of the cutting lines that can be formed on the recording medium, and causes the image forming device to form the output image on the recording medium.

7. The image forming apparatus according to claim 1, wherein the controller classifies the plurality of cut patterns by putting the cut patterns having a same color and a same shape, in a same group.

* * * * *